(12) United States Patent
Cordero Ehrenberg et al.

(10) Patent No.: US 12,321,961 B2
(45) Date of Patent: Jun. 3, 2025

(54) SYSTEMS AND METHODS FOR CUSTOMER-SPECIFIC INCENTIVE PRICING

(71) Applicant: Muscle Group SRL, Panama (PA)

(72) Inventors: Jose Ignacio Cordero Ehrenberg, San Jose (CR); Daniel Perez Umaña, San Jose (CR); Carlos Salguero Moya, San Jose (CR); Jose Ignacio Cordero Lang, San Jose (CR); Carlos Araya Rodriguez, Saratoga, CA (US); Luis Leopoldo Perez Perez, Panama (PA)

(73) Assignee: Muscle Group SRL, Panama (PA)

( * ) Notice: Subject to any disclaimer, the term of this patent is extended or adjusted under 35 U.S.C. 154(b) by 0 days.

(21) Appl. No.: 18/250,610

(22) PCT Filed: Oct. 27, 2021

(86) PCT No.: PCT/IB2021/059946
§ 371 (c)(1),
(2) Date: Apr. 26, 2023

(87) PCT Pub. No.: WO2022/090971
PCT Pub. Date: May 5, 2022

(65) Prior Publication Data
US 2023/0394518 A1      Dec. 7, 2023

Related U.S. Application Data

(60) Provisional application No. 63/106,200, filed on Oct. 27, 2020.

(51) Int. Cl.
*G06Q 30/00*      (2023.01)
*G06Q 30/0207*   (2023.01)

(52) U.S. Cl.
CPC .............................. *G06Q 30/0224* (2013.01)

(58) Field of Classification Search
CPC ................................................... G06Q 30/0224
See application file for complete search history.

(56) References Cited

U.S. PATENT DOCUMENTS 11,151,468 B1 *   10/2021   Chen ................... G06Q 30/0202
11,341,523 B1 *    5/2022   Jacoby .................. G06Q 20/20
(Continued)

OTHER PUBLICATIONS

Yu-Kwong Ricky Kwok; Vincent K.N. Lau, "Incentives in PeertoPeer Computing," in Wireless Internet and Mobile Computing: Interoperability and Performance, IEEE, 2007, pp. 663-695, doi: 10.1002/9780470167960.ch28. (Year: 2017).*

Kun Wang et al., "A trust-incentive-based combinatorial double auction algorithm," 2010 IEEE Network Operations and Management Symposium—NOMS 2010, Osaka, 2010, pp. 209-215, doi: 10.1109/NOMS.2010.5488462. (Year: 2010).*

(Continued)

*Primary Examiner* — Sun M Li
(74) *Attorney, Agent, or Firm* — Alston & Bird LLP

(57) ABSTRACT

Embodiments of the present disclosure provide for improved determination of adjustment unit allocation(s). For a particular user profile and electronic item representation, embodiments determine a recommended adjustment unit allocation particular to a transaction for that user profile and particular electronic item representation that increases and/or maximizes a particular goal metric while simultaneously maintaining or minimizing the decreased likelihood for a user to initiate such a transaction, or maximizing the likelihood that the user will initiate such a transaction. Embodiments of the present disclosure utilize allocation models specially configured for each user and prospective transaction for a particular electronic item representation.

17 Claims, 12 Drawing Sheets

(56) References Cited

U.S. PATENT DOCUMENTS

| | | | | |
|---|---|---|---|---|
| 2005/0256778 | A1* | 11/2005 | Boyd | G06Q 30/0244 705/14.43 |
| 2008/0052170 | A1* | 2/2008 | Storey | G06Q 30/0224 705/14.27 |
| 2010/0106580 | A1* | 4/2010 | Etheredge | G06Q 40/02 705/14.33 |
| 2010/0106589 | A1* | 4/2010 | Etheredge | G06Q 40/02 705/14.25 |
| 2017/0098234 | A1* | 4/2017 | Carlson | G06Q 30/0215 |
| 2019/0279244 | A1* | 9/2019 | Postrel | G06Q 30/0239 |
| 2019/0340700 | A1* | 11/2019 | Haas | G06F 3/0482 |
| 2020/0090187 | A1* | 3/2020 | Parekh | G06N 20/00 |
| 2020/0320561 | A1* | 10/2020 | O'Brien | G06Q 30/0222 |

OTHER PUBLICATIONS

Yu-Kwong Ricky Kwok; Vincent K.N. Lau, "Incentives in PeertoPeer Computing," in Wireless Internet and Mobile Computing: Interoperability and Performance , IEEE, 2007, pp. 663-695, doi: 10.1002/9780470167960.ch28. (Year: 2017) (Year: 2017).*

E. T. Apeh, B. Gabrys and A. Schierz, "Customer profile classification using transactional data," 2011 Third World Congress on Nature and Biologically Inspired Computing, Salamanca, Spain, 2011, pp. 37-43, doi: 10.1109/NaBIC.2011.6089414. (Year: 2011).*

International Searching Authority, International Search Report and Written Opinion received for International Application No. PCT/IB2021/059946, dated Jan. 31, 2022, 10 pages, European Patent Office, Netherlands.

* cited by examiner

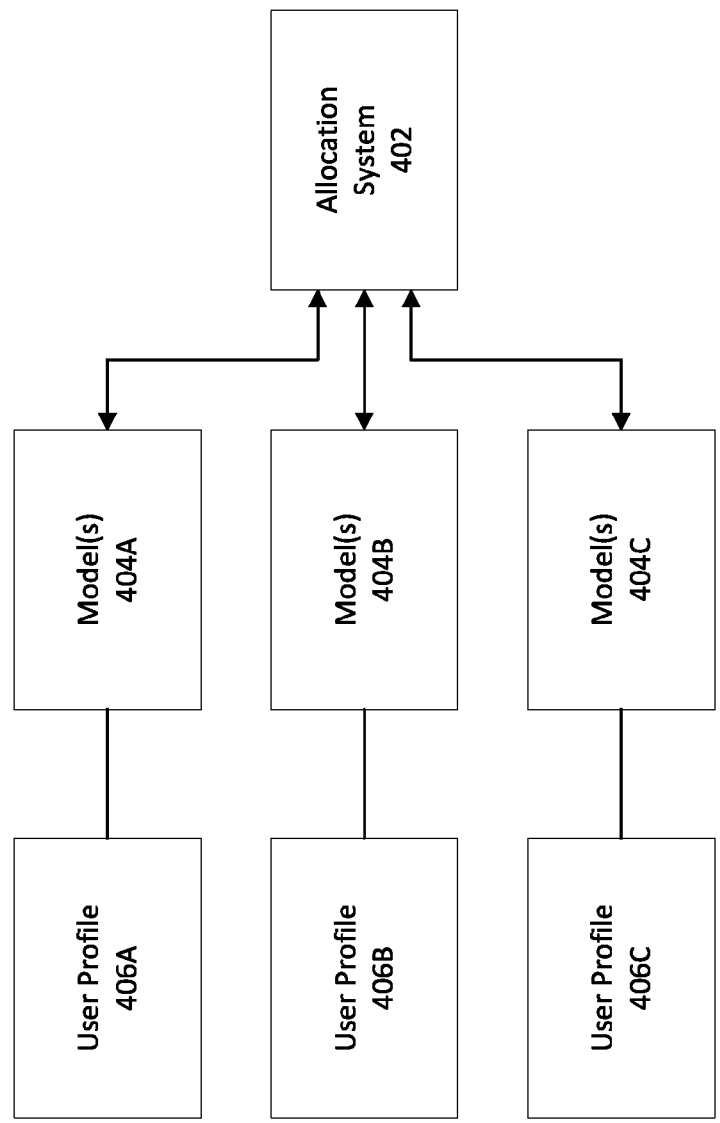

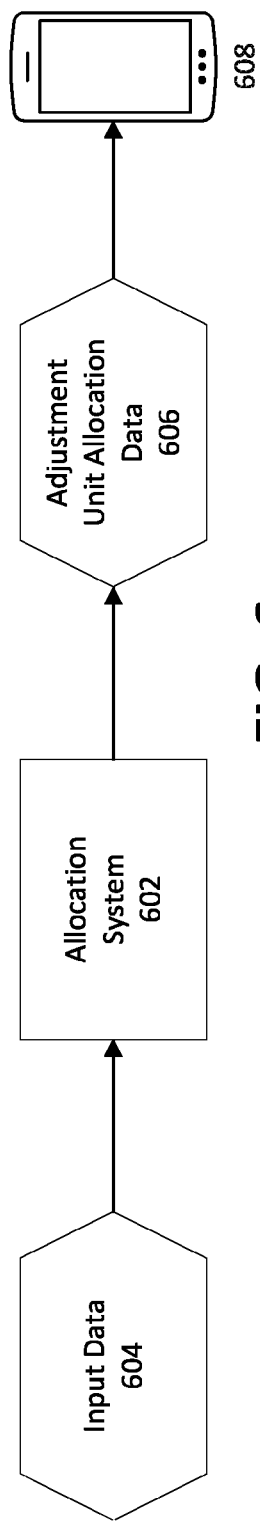

SYSTEMS AND METHODS FOR CUSTOMER-SPECIFIC INCENTIVE PRICING

CROSS-REFERENCE TO RELATED APPLICATIONS

This application is a national stage application filed under 35 U.S.C. § 371 of International Application No. PCT/IB2021/059946 filed Oct. 27, 2021, which application claims priority to U.S. Provisional Application No. 63/106,200, filed Oct. 27, 2020, each of the foregoing applications is hereby incorporated by reference in its entirety.

TECHNOLOGICAL FIELD

Embodiments of the present disclosure generally relate to customer-specific incentive pricing utilizing improved implementations for generating and using specially configured models, and specifically to improved generating and using allocating data model(s) and/or electronic item selection model(s).

BACKGROUND

In various contexts, system(s) attempt to generate data reflective of prospective goods, services, and/or the like available for transacting by particular user(s) of the system(s). In various instances, such system(s) attempt processing of various types of data to select such goods, services, and/or the like, and/or to generate particular offers for such goods, services, and/or the like. Conventional data models fail to accurately select items and/or to accurately generate transmissions and/or interfaces associated with offers for goods, services, and/or the like likely to be engaged with by a particular user. Applicant has discovered problems with current implementations that generate transmissions and/or interfaces resulting in wasted processing, networking, memory, and other computing resources, and/or that are not optimized for user engagement. Through applied effort, ingenuity, and innovation, Applicant has solved many of these identified problems by developing embodied in the present disclosure, which are described in detail below.

BRIEF SUMMARY

In general, embodiments of the present disclosure are provided for improved data model generation and use, for example for generating and using allocating data model(s) and/or electronic item selection model(s). Other implementations for improved model generation and use will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method is provided. The computer-implemented method is executable via any of a myriad of computing devices embodied in hardware, software, firmware, and/or a combination thereof, as described herein. In one example implementation, the example computer-implemented method includes aggregating a user profile data set corresponding to a user identifier. The example computer-implemented method further includes determining an adjustment unit count corresponding to the user identifier. The example computer-implemented method further includes identifying an electronic item representation. The example computer-implemented method further includes determining electronic item transactability data corresponding to the electronic item representation. The example computer-implemented method further includes determining an adjustment unit allocation corresponding to the electronic item representation by applying at least a portion of the user profile data set, the adjustment unit count, and the electronic item transactability data to an allocating data model corresponding to the user identifier. The example computer-implemented method further includes outputting the adjustment unit allocation associated with the user identifier.

Additionally or alternatively, in some example embodiments of the example computer-implemented method, the example computer-implemented method further includes receiving a system transaction indication, the system transaction indication associated with the user identifier and an electronic item identifier that identifies the electronic item representation.

Additionally or alternatively, in some example embodiments of the example computer-implemented method, the example computer-implemented method further includes configuring the allocating data model based at least in part on one or more model parameters.

Additionally or alternatively, in some example embodiments of the example computer-implemented method, the one or more model parameters includes a skew parameter, a plateau parameter, and an actual maximum value corresponding to the electronic item representation, the user identifier, and the adjustment unit count.

Additionally or alternatively, in some example embodiments of the example computer-implemented method, the example computer-implemented method further includes training an electronic item selection model corresponding to the user identifier based at least in part on an item selection training data set; and generating, utilizing the electronic item selection model, a selected item set including at least the electronic item representation.

Additionally or alternatively, in some example embodiments of the example computer-implemented method, the user identifier is associated with an empty user profile data set, and the computer-implemented method further includes determining at least one other user profile similar to a user profile corresponding to the user identifier based at least in part on a profile characteristic; retrieving a second user profile data set corresponding to the at least one other user profile; and aggregating the user profile data set corresponding to the user identifier to include the second user profile data set.

Additionally or alternatively, in some example embodiments of the example computer-implemented method, outputting the adjustment unit allocation associated with the user identifier includes causing rendering, to a user device associated with the user identifier, of a user interface including at least one interface element associated with the adjustment unit allocation, the at least one interface element rendered visually prominent with respect to at least one other interface element of the user interface.

Additionally or alternatively, in some example embodiments of the example computer-implemented method, the allocating data model defines a curve based at least in part on a skew parameter and a plateau parameter, the skew parameter and the plateau parameter generated based at least in part on the electronic item transactability data and the user profile data set.

Additionally or alternatively, in some example embodiments of the example computer-implemented method, outputting the adjustment unit allocation associated with the user identifier includes causing rendering, to a user device associated with the user identifier, of a user interface including at least an interface element associated with the adjustment unit allocation for initiating a transaction associated with the electronic item representation, where the user interface is rendered further includes at least a first additional interface element associated with a first alternative adjustment unit allocation corresponding to use of no adjustment allocation points to initiate the transaction associated with the electronic item representation, and where the user interface is rendered further including at least a second additional interface element associated with a second alternative adjustment unit allocation corresponding to use of only adjustment allocation points to initiate the transaction.

Additionally or alternatively, in some example embodiments of the example computer-implemented method, the example computer-implemented method further includes receiving an indication of a transaction to be offered associated with a user identifier, the transaction associated with the electronic item representation; and in response to receiving the indication of the transaction to be offered, configuring the allocating data model based on data associated with the electronic item representation and a user profile corresponding to the user identifier; and terminating storage of the allocating data model in response to outputting of the adjustment unit allocation.

Additionally or alternatively, in some example embodiments of the example computer-implemented method, outputting the adjustment unit allocation includes causing rendering of a user interface based at least in part on the adjustment unit allocation, and the computer-implemented method further includes receiving an indication of a transaction to be offered associated with the user identifier, the transaction associated with the electronic item representation; and configuring the allocating data model based on data associated with the electronic item representation and a user profile corresponding to the user identifier; maintaining the allocating data model while the user interface is accessible to a user profile associated with the user identifier; receiving a second indication that the user interface is no longer accessible to the user profile associated with the user identifier; and terminating storage of the allocating data model in response to the second indication.

BRIEF DESCRIPTION OF THE DRAWINGS

Figure 1:
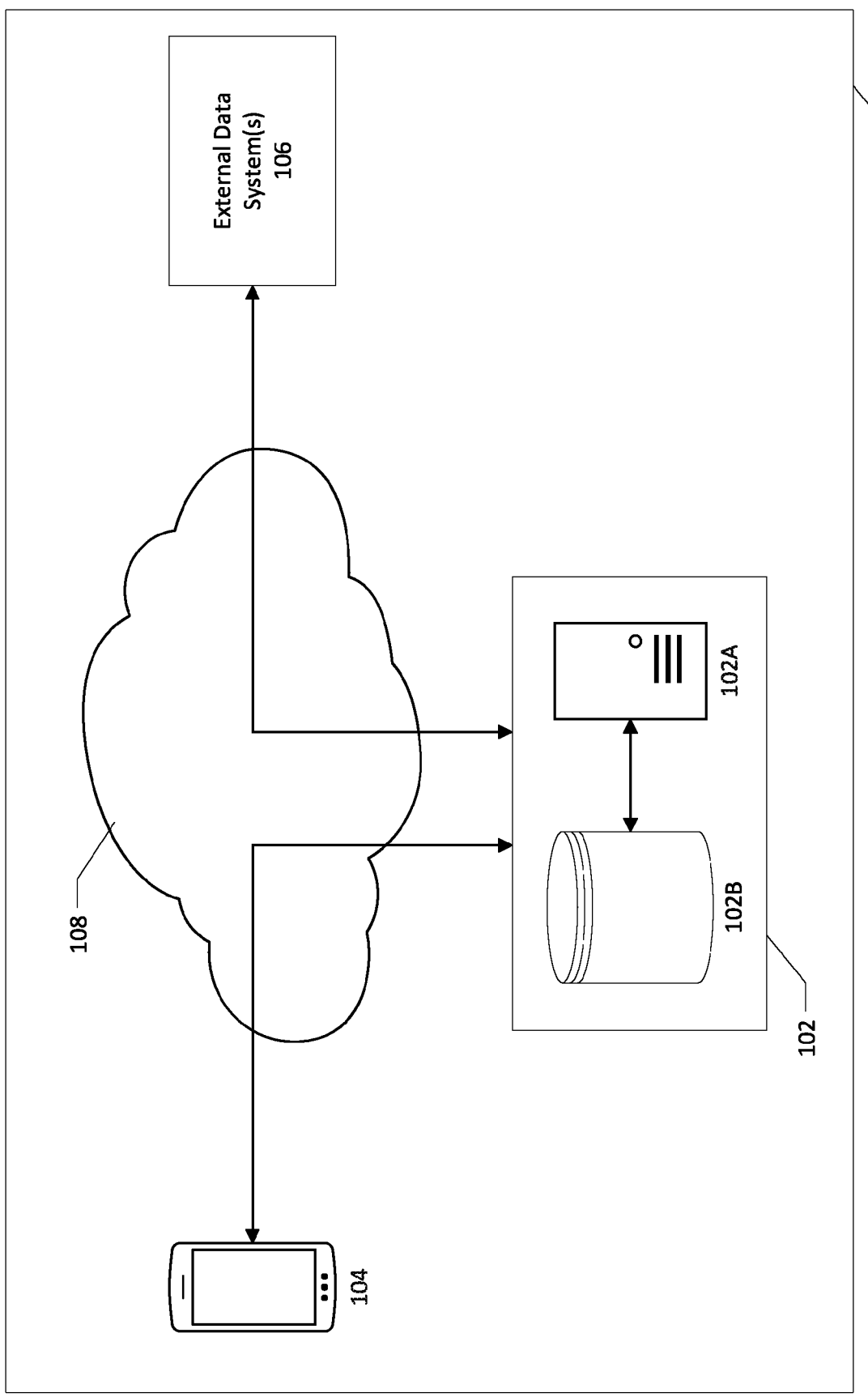
Figure 2:
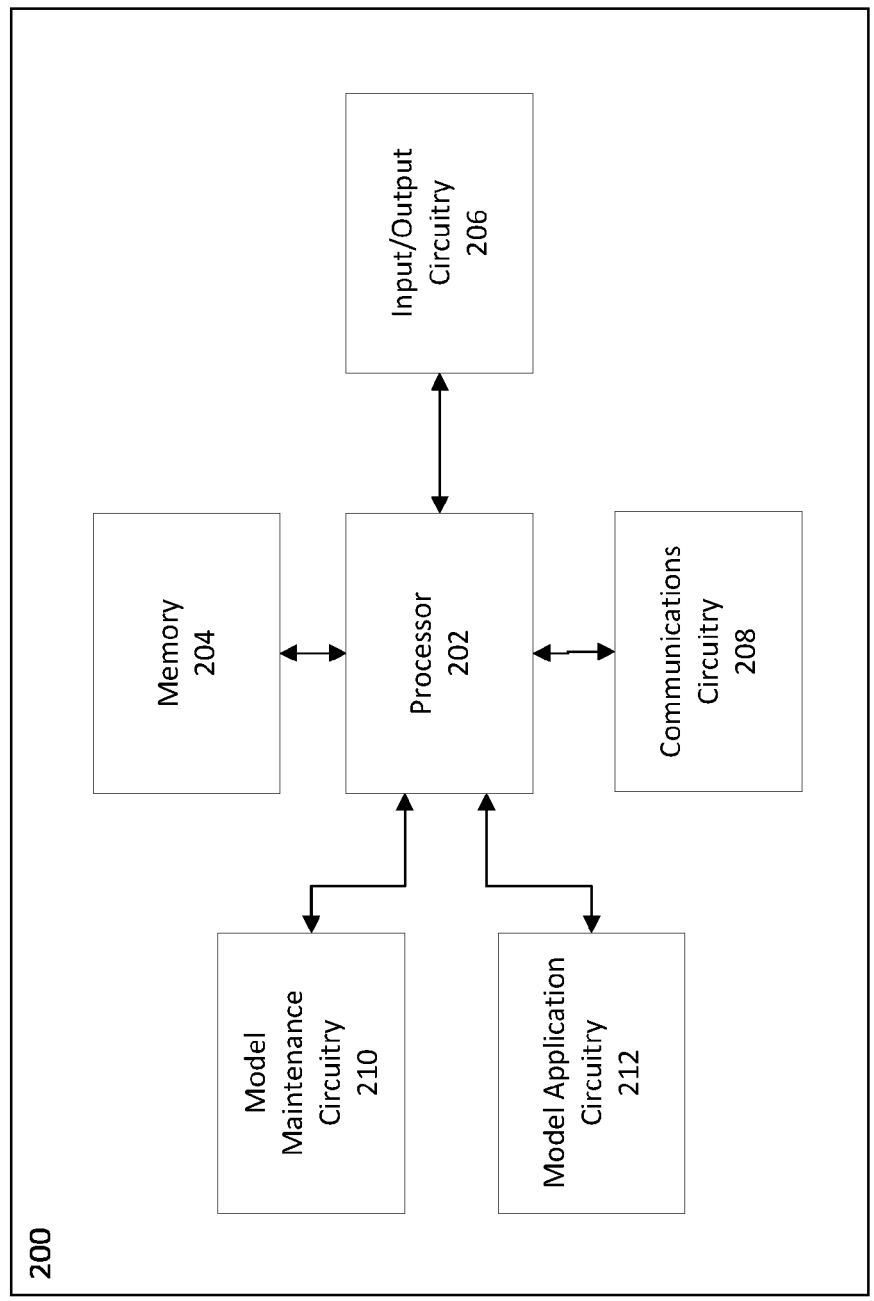
Figure 3:
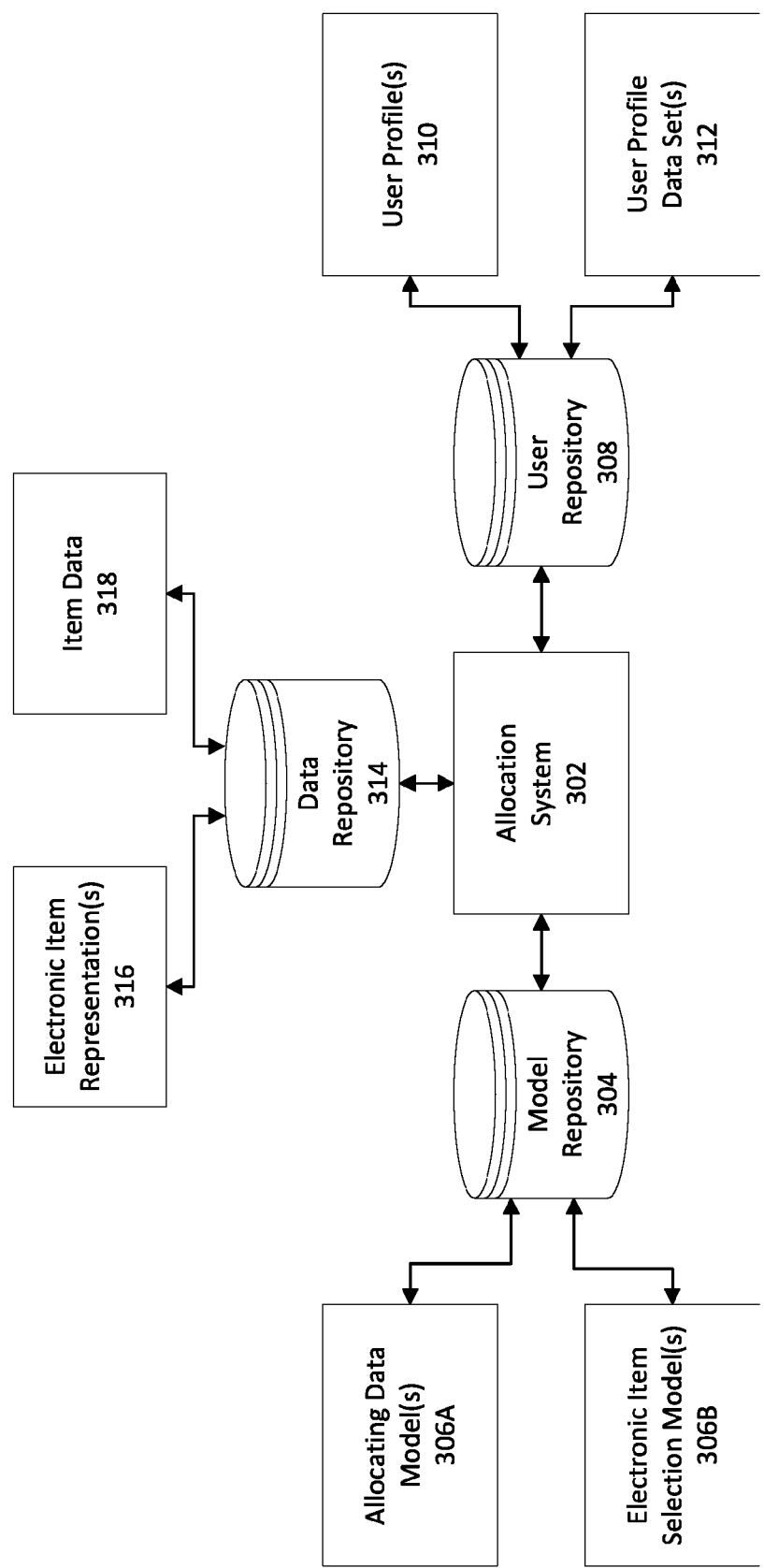
Figure 5A:
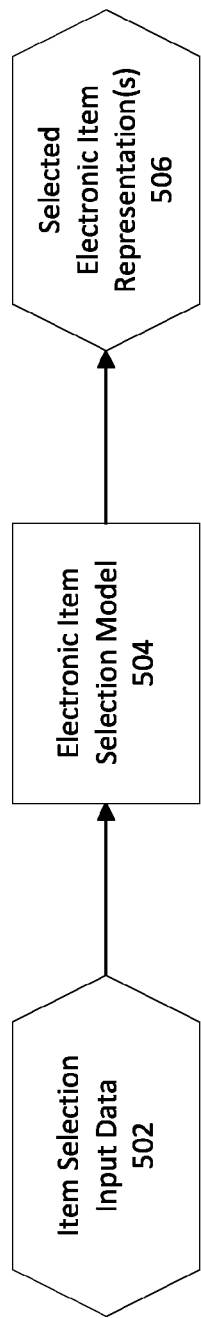
Figure 5B:
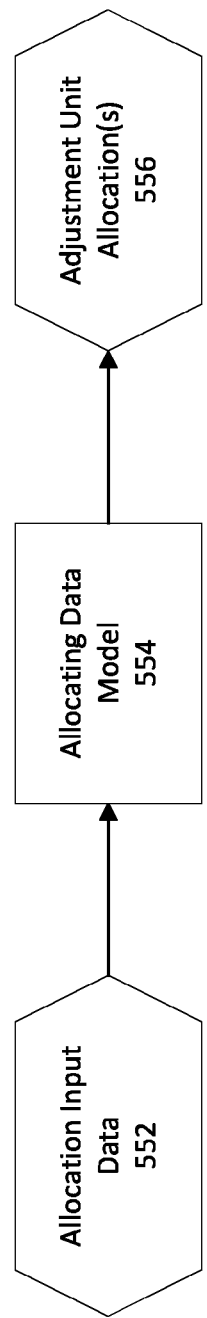
Figure 7:
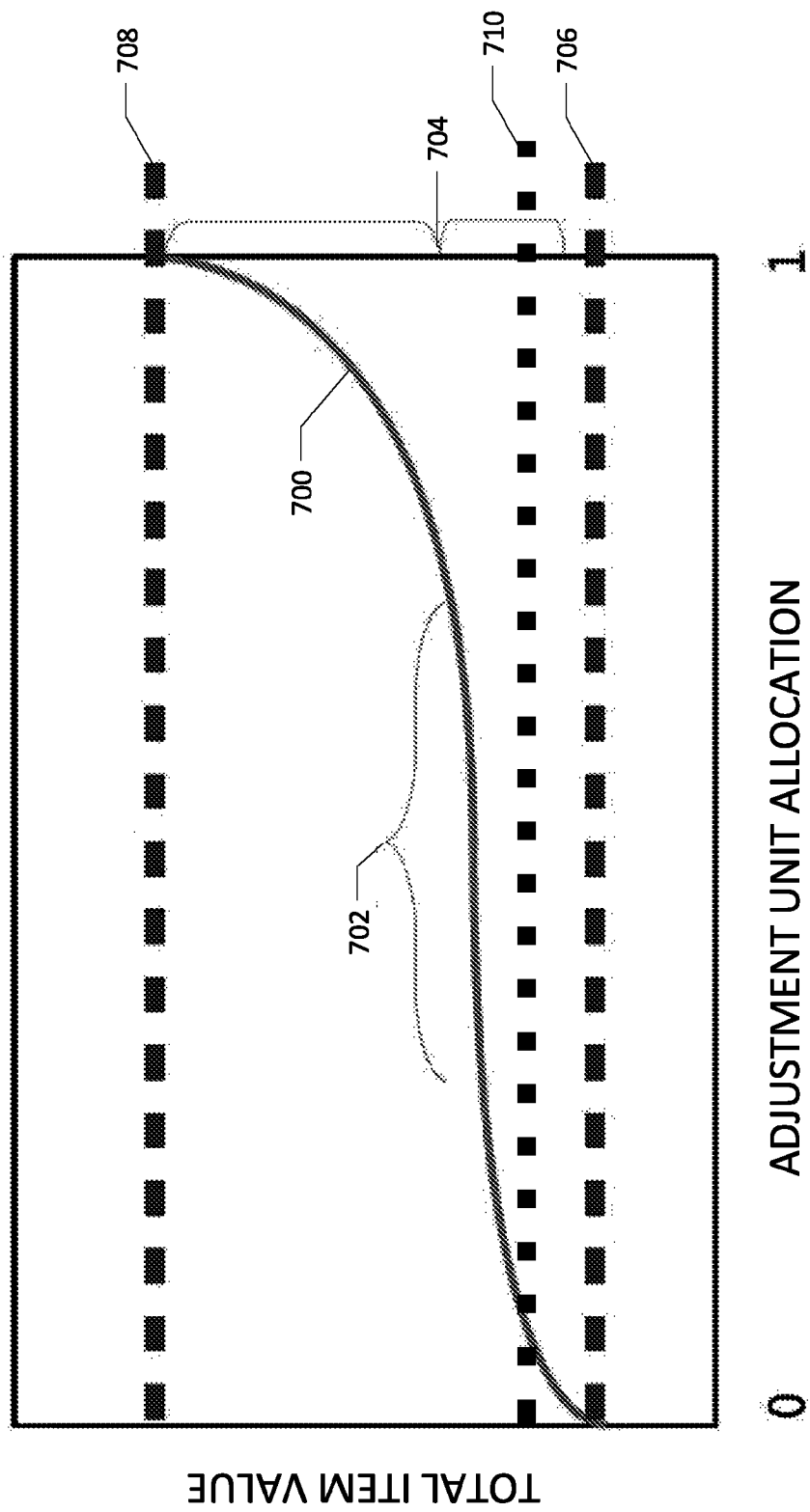
Figure 8:
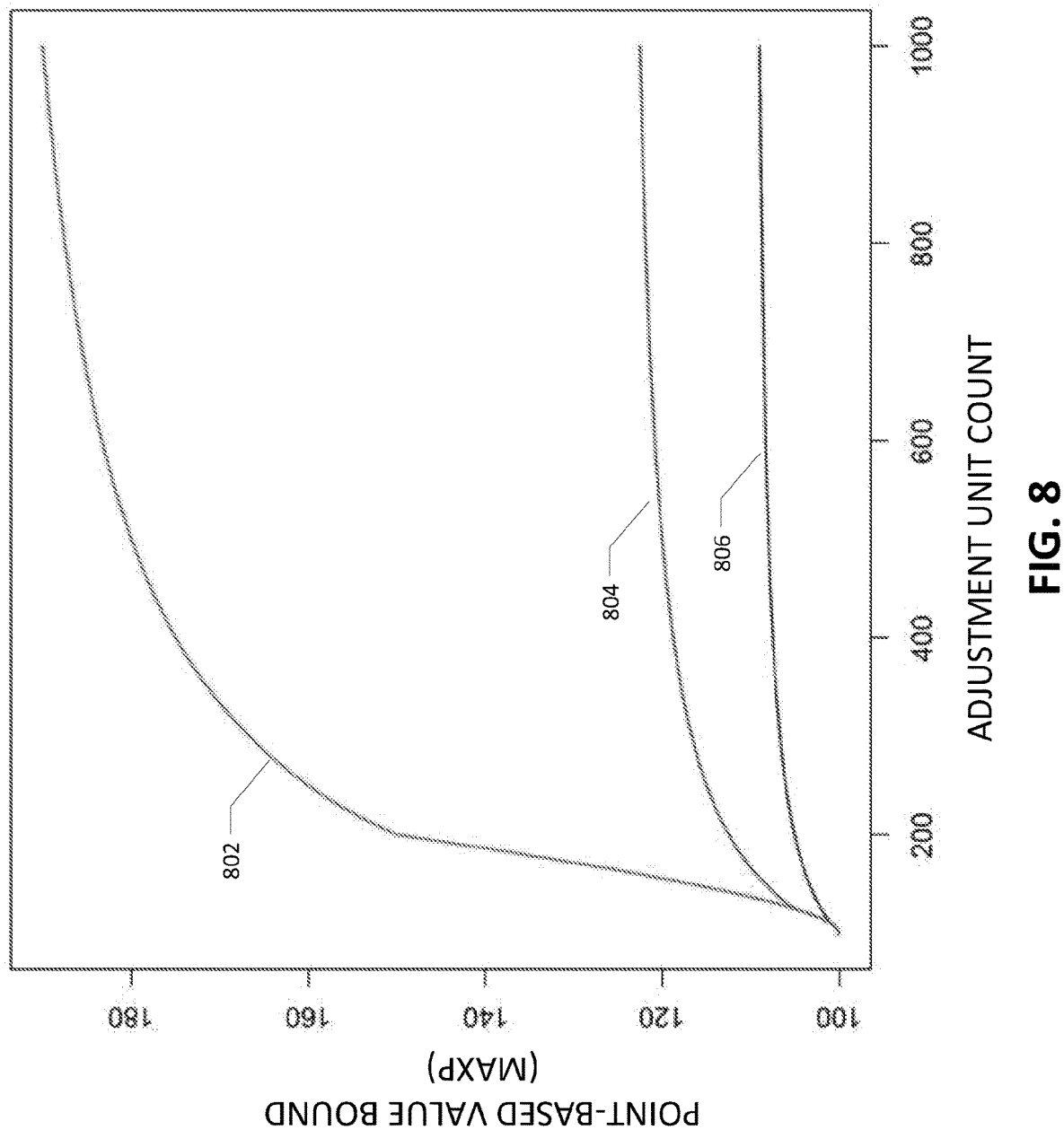
Figure 9:
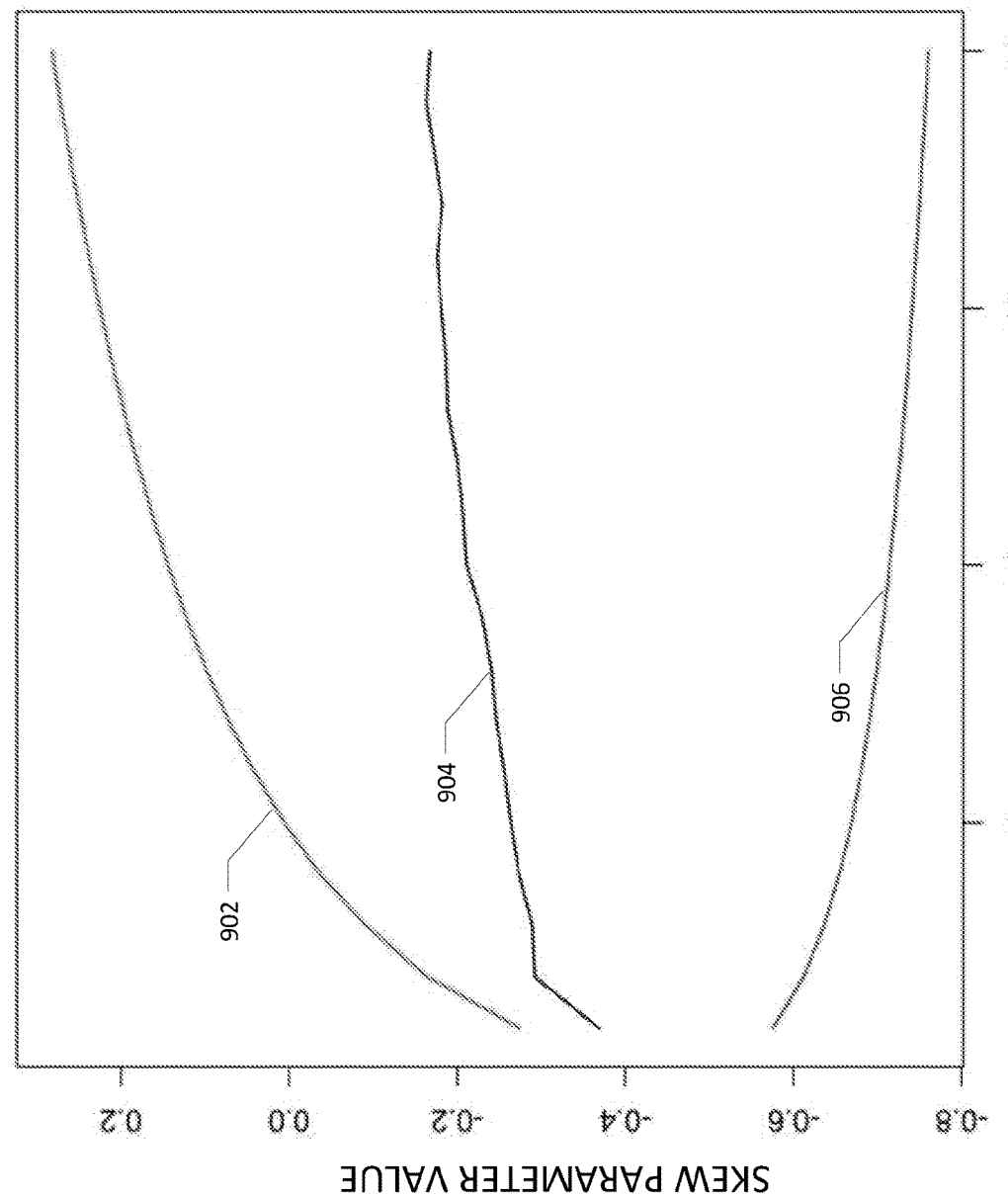
Figure 10:
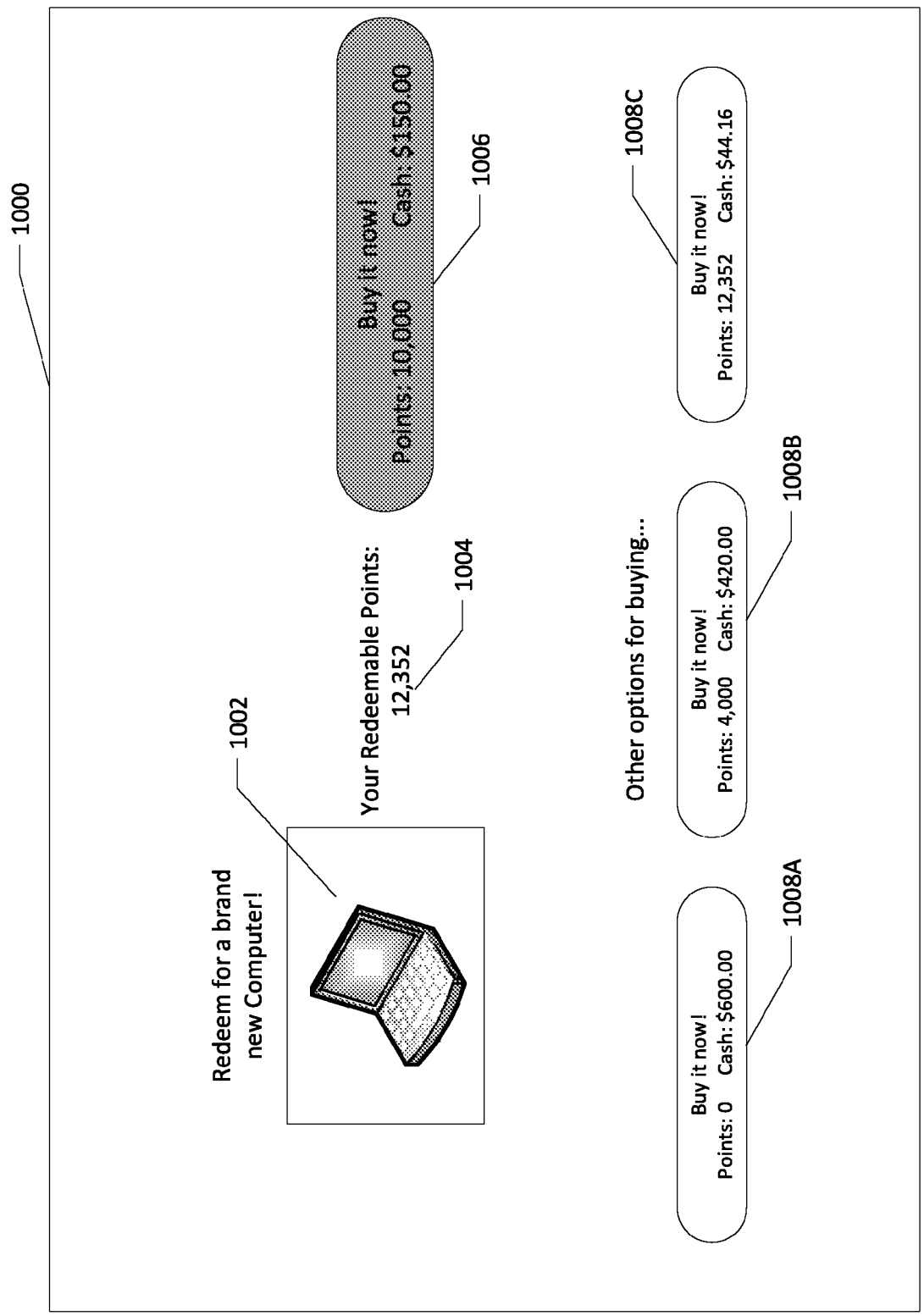
Figure 11:
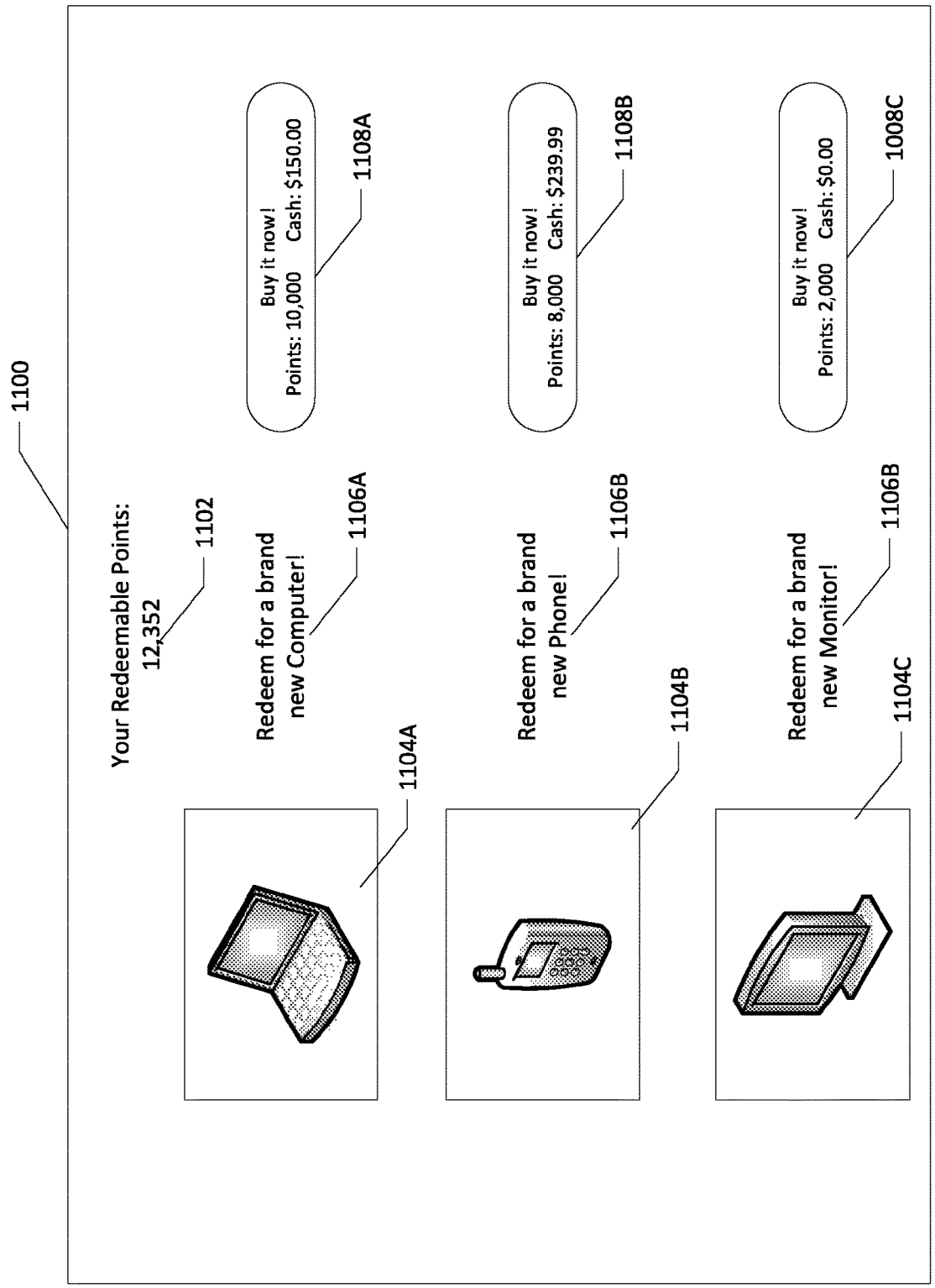
Figure 12:
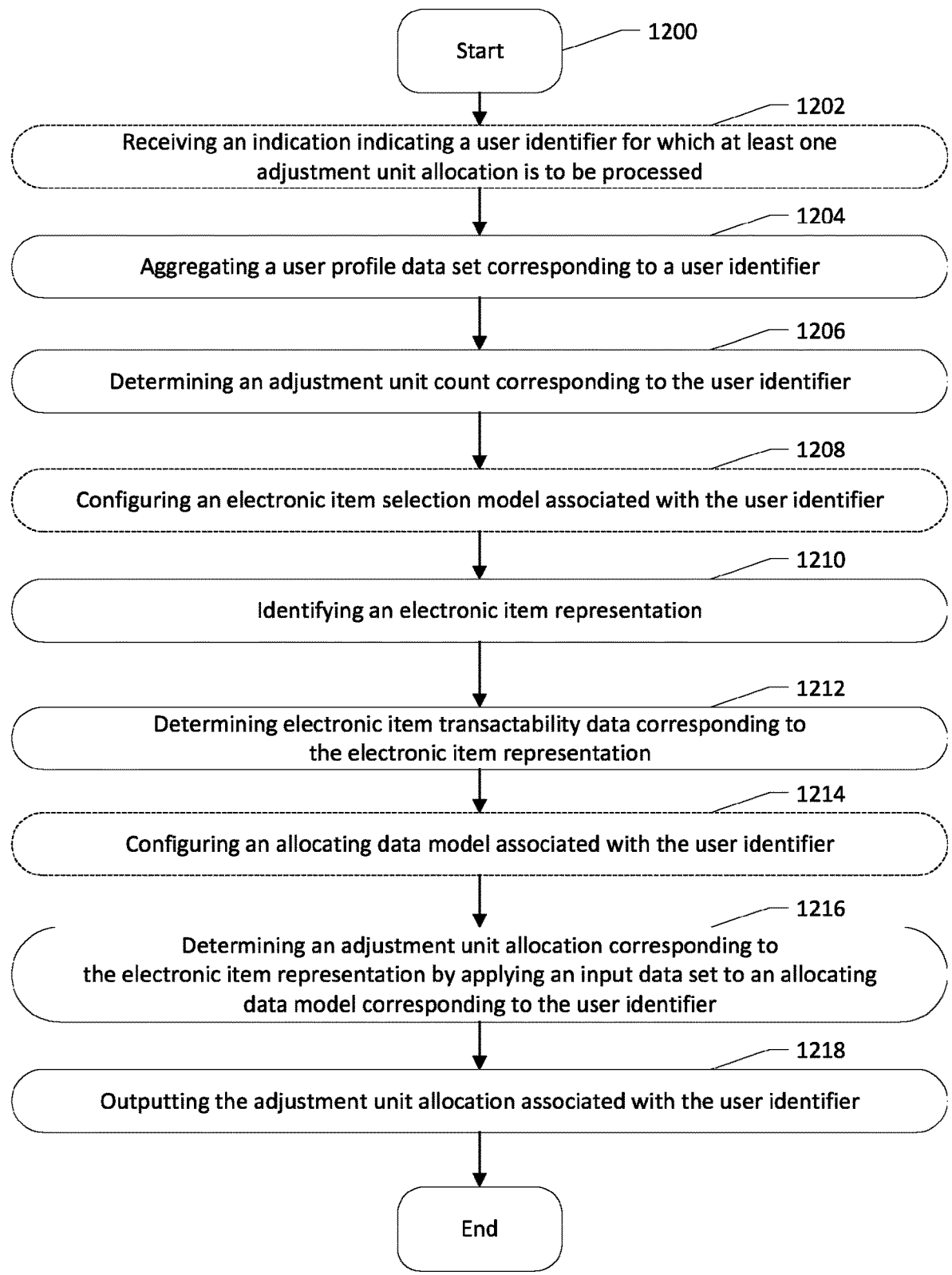

Having thus described the embodiments of the disclosure in general terms, reference now will be made to the accompanying drawings, which are not necessarily drawn to scale, and wherein:

FIG. 1 illustrates a block diagram of a data modeling system that may be specially configured within which embodiments of the present disclosure may operate;

FIG. 2 illustrates a block diagram of an example allocation modeling apparatus that may be specially configured in accordance with at least some example embodiments of the present disclosure;

FIG. 3 illustrates a visualization of an example data environment in accordance with at least some example embodiments of the present disclosure;

FIG. 4 illustrates a visualization of example data relationships in accordance with at least some example embodiments of the present disclosure;

FIG. 5A illustrates a first example use of model(s) maintained by an allocation system in accordance with at least some example embodiments of the present disclosure;

FIG. 5B illustrates a second example use of model(s) maintained by an allocation system in accordance with at least some example embodiments of the present disclosure;

FIG. 6 illustrates an example of outputting adjustment unit allocation data in accordance with at least some example embodiments of the present disclosure;

FIG. 7 illustrates a graphical depiction of model parameters generated in accordance with at least some example embodiments of the present disclosure;

FIG. 8 illustrates a graphical visualization of relationships between point-based value bound and adjustment unit count in accordance with at least some example embodiments of the present disclosure;

FIG. 9 illustrates a graphical visualization of relationships between skew parameter value for a particular user profile and transactions initiated associated with the particular user profile in accordance with at least some example embodiments of the present disclosure;

FIG. 10 illustrates an example graphical user interface including interface elements associated with an adjustment unit allocation for an electronic item recommended for a particular user in accordance with at least some example embodiments of the present disclosure;

FIG. 11 illustrates an example graphical user interface including interface elements associated with an adjustment unit allocation for each electronic item of a plurality of electronic items recommended for a particular user in accordance with at least some example embodiments of the present disclosure; and FIG. 12 illustrates a flowchart depicting example operations of an example process for generating an adjustment unit allocation in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto resistive random-access memory (MRAM), resistive random-access memory (RRAM), Silicon-Oxide-Nitride-Oxide-Silicon memory (SONOS), floating junction gate random access memory (FJG RANI), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Overview

Embodiments of the present disclosure determine adjustment unit allocation(s) recommended for one or more electronic item representation(s). Such adjustment unit allocation(s) are determinable for arbitrarily identified, randomly identified, and/or otherwise browsed virtual or otherwise electronic item representation(s) with which a user may transact (e.g., items reflected via a graphical user interface). Alternatively or additionally, such adjustment unit allocation(s) are determinable for selected electronic item representations that embodiments determine are likely to be transacted by the user associated with the particular user profile and/or likely to be of interest to the user associated with the user profile.

Based on particular data associated with the user profile and/or user profiles determined similar to the user profile being processed, embodiments of the present disclosure specially configure allocation model(s) that accurately functions for a particular user profile. As such, the generated model(s) perform with particular accuracy maximized based on the interaction(s) performed by said user corresponding to the user profile, their interests, and their subjective value provided to adjustment units as the adjustment unit count corresponding to the user profile fluctuates. In some embodiments, the model(s) are configurable based at least in part on training data and/or model parameter(s) determined from data associated with the user profile and/or similar user profile(s). Accordingly, embodiments of the present disclosure generate adjustment unit allocation(s) with improved accuracy for individual users corresponding to particular user profiles, and can utilize such improved allocation model(s) to improve and/or better achieve one or more goal metrics, improve transaction likelihood, and/or the like.

Embodiments of the present disclosure generate specially-configured data model(s) in a myriad of manners. In some embodiments, data model(s) are configured for improved accuracy with respect to a specific user profile and/or transaction, such that the resulting data model accurately produces data specifically accurate for optimizing a particular goal metric with respect to the particular user profile and/or transaction (e.g., likelihood that a user associated with the user profile initiates a transaction transmitted via the user profile, likelihood that a user associated with the user profile is interested in a particular transaction offered to the user, profitability of a particular transaction offered to a user, and/or the like). Further in this regard, data model(s) in some embodiments are specially configured for each of a plurality of user profile(s) and/or transaction(s), such that the data model performs with optimal accuracy for that particular user profile and/or transaction. Such data model(s) are configurable based on particular data that enables such data model(s) to accurately function with respect to a particular user profile and/or transaction. In some embodiments, embodiments identify characteristics of user profile(s) and/or transaction(s) that are similar to a user profile and/or transaction for which a data model is to be trained, such that accurate data model configuration is performable even in circumstances with minimal training data available for the particular user profile associated therewith based on the associations with such similarly situated data.

Some embodiments of the present disclosure utilize specially configured allocation model(s) to improve the likelihood that a user corresponding to a particular user profile initiates a transaction. In this regard, such embodiments reduce expenditure of wasted computing resources that would otherwise be utilized to generate user interface(s), data transmission(s), and/or otherwise process data to generate offer message(s) associated with adjustment unit allocation(s) that are sub-optimal or not likely to be engaged with by a user to initiate a transaction. Accordingly, such embodiments improve the use of computing resources available for providing such functionality and/or related service(s) to user(s) accessing such embodiments and/or related system(s). Alternatively or additionally, in some embodiments, embodiments of the present disclosure generate specially configured user interfaces that visually enhance and/or more prominently display certain interface element(s) associated with a recommended adjustment unit allocation, making such interface element(s) more readily identifiable to a corresponding user and/or easily accessible for engagement by said user.

Technical Problems

Embodiments of the present disclosure address several technical problems identified by the inventors to exist in various technical fields. In some contexts, embodiments of the present disclosure address one or more technical problems in the technical field of data model training, for example addressing technical problems with respect to generating accurate data model(s) in circumstances where minimal or no data is available for a particular user profile. Additionally or alternatively, in some contexts, embodiments of the present disclosure address one or more technical problems in the technical field of electronic transmission generation and provision, for example addressing technical problems with respect to reducing and/or minimizing computing resources wasted in generating and/or outputting, rendering, and/or otherwise providing data transmission(s) and/or interface(s) unlikely to be engaged with by a user associated with a user profile that receives such data. Additionally or alternatively, in some contexts, embodiments of the present disclosure address one or more technical problems in the technical field of targeted data model generation, for example addressing technical problems with respect to accurately generating such targeted data models, including generation of user-specific and/or transaction-specific (e.g., specific to a particular user profile and electronic item representation) data models. Additionally or alternatively, in some contexts, embodiments of the present disclosure address one or more technical problems in the technical field timely generating accurate custom data models, for example addressing technical problems with respect to problems with real-time and/or near-real-time (e.g. within seconds, or in some contexts within minutes) of data model(s) specifically trained or otherwise configured to improve accuracy with respect to a particular user profile and/or transaction. Embodiments of the present disclosure address each of these technical problems utilizing each of the elements recited in the claims following this disclosure.

Technical Solutions

Embodiments of the present disclosure provide technical advantages and/or technical solutions to the technical problems identified herein in a myriad of ways. Some embodiments identify similar user profile(s) to aggregate a user profile data set and/or transaction data for training and/or otherwise configuring data model(s) specific to a particular user profile associated with minimal or no data. Additionally or alternatively, some embodiments aggregate a user profile data set for use in specially configuring data model(s) to accurately output data specific to a particular user profile and/or a particular transaction (e.g., based at least in part on data associated with an electronic item representation of a transaction, such as electronic item transactability data). Additionally or alternatively, some embodiments utilize particular data and data model(s) (e.g., based on particular model parameters) to train and/or otherwise configure such data model(s) in real-time or near-real time without sacrificing accuracy of the data model specifically with respect to a particular user profile and/or transaction. Additionally or alternatively, some embodiments output transmission(s) and/or interface(s) associated with accurately-determined adjustment unit allocation(s) generated by a specially trained and/or configured data model (e.g., an allocating data model) to reduce computing resource waste by increasing user interaction with such transmission(s) and/or interface(s). In this regard, transmission(s) and/or interface(s) generated associated with such adjustment unit allocation(s) are more inherently more likely to receive and/or prompt user engagement, and thus reduce computing resources wasted on unengaged transmission(s) and/or interface(s), in circumstances where the allocating data model maximizes user engagement during such configuration for a particular user and/or transaction. It will be appreciated that embodiments of the present disclosure provide such technical solutions and/or technical advantages utilizing each of the elements recited in the claims following this disclosure.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "user profile" refers to electronically managed data that represents one or more aspects of a user. In some embodiments, a user profile includes one or more portion(s) of data representing aspect(s) of a particular user.

The term "user identifier" refers to electronically managed data that uniquely identifies a particular user and/or corresponding user profile. Non-limiting examples of a user identifier include a global user identifier, The term "user profile data set" refers to electronically managed data associated with a particular user represented by a user profile, and/or data associated with interactions initiated and/or otherwise performed associated with the user profile via one or more system(s).

The term "adjustment unit" refers to electronically managed data that is allocable towards a particular transaction to offset one or more resource requirements associated with initiation of the transaction. In one example context, an adjustment unit offsets a value of electronic currency to be exchanged to initiate a transaction. Non-limiting examples of adjustment units include reward point(s), merchant credit(s), and/or other redeemable instruments allocable towards transaction(s) to adjust the required allocation of electronic currency (e.g., payment via credit card, cash, and/or another representation of currency) to complete the transaction.

The term "adjustment unit count" when used with respect to a particular user profile refers to a number or an amount of adjustment units allocable towards a particular transaction or set of transactions.

The term "electronic item representation" refers to electronically managed data embodying properties of a digital item and/or a digital representation of a real-world item with which a user profile may transact.

The term "electronic item identifier" refers to electronically managed data that uniquely identifies a particular electronic item representation.

The term "electronic item transactability data" refers to electronically managed data associated with one or more determinable metric(s) associated with offloading, sale, and/or transfer of an item corresponding to an electronic object representation. In some embodiments, electronic item transactability data includes a plurality of portions of electronic item transactability data, each portion representing different types of data. Non-limiting examples of a portion of electronic item transactability data includes an item based cost, an item suggested price, an item-specific price elasticity value and/or range for a particular user, an item-specific price elasticity value and/or range for a particular group of users, an item-specific price elasticity value for a particular item type, and/or any combination thereof.

The term "transaction" refers to electronically managed data representing an initiated exchange of electronic currency value and/or adjustment unit(s) for an item represented by an electronic item representation. A transaction is associated with a particular electronic item representation that represents a particular item to be transferred, and a transaction is associated with a particular electronic item representation to which the item is to be provided. In some embodiments, a transaction is "offered" associated with a user profile via one or more specially configured transmission(s) and/or user interfaces to enable the user to authorize the transaction at a particular value defined by a combination of adjustment unit(s) and/or electronic currency.

The term "adjustment unit allocation" refers to electronically managed data representing a ratio, a percentage, and/or a count of adjustment units to be allocated towards a particular transaction associated with an electronic item representation. In some contexts, an adjustment unit allocation is automatically determined to maximize the likelihood that a particular user initiates a transaction, and/or to maximize another target variable (e.g., profit).

The term "allocating data model" refers to a statistical, algorithmic, and/or machine learning model that generates an adjustment unit allocation for a particular transaction involving a particular user profile and a particular electronic item representation. Non-limiting examples of an allocating data model include a curve of adjustment unit allocations algorithmically defined by a particular set of model parameters.

The term "electronic item selection model" refers to a statistical, algorithmic, and/or machine learning model that generates a selected set of electronic item representations from a set of possible electronic item representations for a particular user profile.

The term "model parameter" refers to a particular determinable data value for a property defining a particular model. In some embodiments, a model is defined by a combination of a plurality of model parameters.

The term "system transaction indication" refers to electronically managed data associated with a particular user profile that indicates a user request to transact with a particular electronic item representation.

The term "item selection training data" refers to data aggregated from one or more sources and/or user interactions that indicate a preference of a particular user profile for one or more subsets of available electronic item representation(s).

The term "selected item set" refers to electronically managed data defining one or more item representation(s) determined for outputting and/or otherwise providing associated with a particular user profile. In some example contexts, a selected item set includes any number of electronic item representation(s) determined likely to be of interest for a particular user profile.

Example System Architectures of the Present Disclosure

FIG. 1 illustrates a block diagram of a data modeling system that may be specially configured within which embodiments of the present disclosure may operate. The system 100 may comprise a plurality of computing device(s), including one or more allocation system(s) 102, one or more user device(s) 104, and/or one or more external data system(s) 106.

The computing device(s) each may communicate over one or more communications networks, for example over one or more communications networks 108. For example, each of the components of the system may be in electronic communication with, for example, one another over the same or different wireless or wired networks embodying the communications networks 108, including and without limitation for example a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture. In other embodiments, one or more computing entities share one or more components, hardware, and/or the like, or otherwise are embodied by a single computing device.

In some embodiments, each user device of the user device(s) 104 is embodied in hardware, software, firmware, and/or a combination thereof. The user device(s) 104 provide access to the system 100 to one or more end users. In one example context, the user device(s) provide access to functionality for generating selected electronic item(s) and/or determining adjustment unit allocation(s) for such selected electronic item(s). In some embodiments, the one or more user device(s) 104 embody one or more handheld computing device(s), laptop computing device(s), desktop computing device(s), and/or one or more Internet-of-Things (IoT) enabled devices, and/or the like. A user device of the user device(s) 104 in some embodiments executes and/or otherwise maintains one or more user-facing application(s) that provide access to such functionality alone or via interaction with other device(s) of the system 100, for example the allocation system(s) 102. In some contexts, a user device of the user device(s) 104 includes hardware, software, firmware, and/or a combination thereof, such as one or more display(s), peripheral devices, and/or the like), that enables a user to view depicted and/or otherwise provided information (e.g., graphical user interface(s)) and/or interact with such information (e.g., via user engagement with graphical user interface(s)). In some embodiments, a user device is authenticated as associated with a particular user profile, for example via authentication credentials associated with the user profile, to enable access to particular functionality based on the data associated specifically with the authenticated user profile. In this regard, it will be appreciated that in some contexts different user(s) utilize different user devices of the user device(s) 104 to access functionality specific to their particular associated user profile. In other contexts, two or more users (or a single user) may alternate authenticated sessions associated with two different user profile(s) via a single user device.

In some embodiments, an allocation system of the allocation system(s) 102 is embodied in hardware, software, firmware, and/or a combination thereof. In some embodiments, the allocation system(s) 102 provide functionality for generating and/or otherwise determining an adjustment unit allocation associated with one or more user profile(s) and/or providing such an adjustment unit allocation. In some embodiments, the allocation system(s) 102 embody a transactions recommendation and/or processing system associated with facilitating transactions with various users for electronic item representations made available to the allocation system(s) 102. In some embodiments, the allocation system(s) 102 utilize one or more model(s) to perform such functionality, for example to perform selection of electronic item representation(s) for a particular user profile, and/or for determining an adjustment unit allocation for a particular user profile and/or particular electronic item representation. In some embodiments, an allocation system of the allocation system(s) 102 includes or embodies an incentive generation system that generates and provides particular adjustment unit allocation(s) for transaction(s) to improve the likelihood of a particular user associated with a user profile initiating such a transaction (e.g., as an incentive using adjustment unit(s) as part of the transaction).

In some embodiments, an allocation system of the allocation systems 102 includes at least one allocation server 102A and at least one allocation repository 102B. The allocation server 102A includes any number of computing device(s), each embodied in hardware, software, firmware, and/or a combination thereof. The allocation server 102A is specially configured to perform the functionality for electronic item representation selection and/or adjustment allocation determination and provision. In some embodiments, the allocation server 102A maintains one or more specially configured application(s) that provide the functionality described herein. In some embodiments, the allocation server 102A facilitates communication with one or more other devices, for example over the communications network(s) 108, to perform one or more operations of such functionality for selecting electronic item representation(s) and/or determining adjustment unit allocation(s) for particular user profile(s) and/or particular electronic item representation(s). In some embodiments, the allocation server 102A includes or is embodied by one or more specially configured web server(s), terminal(s), personal computer(s), and/or the like. In some embodiments, the allocation server 102A is embodied by one or more virtual server(s) operating on shared and/or dedicated computing hardware (e.g., in a virtual environment). In some embodiments the allocation server 102A includes or is embodied by one or more cloud server(s). It will be appreciated that, in some contexts, the allocation server 102A includes one or more sub-server(s), for example each sub-server specially configured to perform particular functionality individually or in combination with one or more other sub-server(s).

The allocation repository 102B includes any number of computing device(s), each embodied in hardware, software, firmware, and/or a combination thereof. The allocation repository 102B stores data utilized to select electronic item representation(s) for a particular user profile and/or determined adjustment unit allocation(s) for a particular user profile and electronic item representation. In some embodiments for example the allocation repository 102B stores and/or otherwise maintains available electronic item representations that possibly could be selected, user profile(s) registered and/or data associated therewith, user interaction data associated with particular user profile(s), user preference data associated with particular user profile(s), and/or the like. In some embodiments, the allocation repository 102B is embodied entirely in physical hardware (e.g., a secured and/or encrypted drive or database) controlled by the allocation server 102A and/or a related computing device. Alternatively or additionally, in some embodiments, the allocation repository 102B includes or is embodied as a virtual repository accessible to the allocation server 102A. Additionally or alternatively still, in some embodiments, the allocation repository 102B includes or is embodied by one or more cloud repository/repositories, which may be located remote from the allocation server 102A and/or one or more sub-server(s) thereof. It will be appreciated that the allocation repository 102B may include any number of sub-repositories, backup repository/repositories (e.g., redundant and independent disks or "RAID" storage), network-attached storage ("NAS") devices, and/or the like.

In some embodiments, an external data system of the external data system(s) is embodied in hardware, software, firmware, and/or a combination thereof. Each external data system of the external data system(s) 106 provides data and/or functionality utilized to select electronic item representation(s) for a particular user profile and/or determine an adjustment unit allocation for particular user profile and/or electronic item representation. In some embodiments, one or more of the external data system(s) maintains an adjustment unit count for a particular user corresponding to a user profile of the allocation system(s) 102. The allocation system(s) 102 in some such embodiments communicate with the external data system(s) 106 to determine the allocation point count available for a particular user profile. Additionally or alternatively, in some embodiments, the external data system(s) 106 facilitate redemption of one or more adjustment allocation point(s) upon initiation of a transaction by a particular user, for example via the allocation system(s) 102.

Additionally or alternatively, in some embodiments, one or more of the external data system(s) 106 facilitate transaction(s), functionality, and/or other process(es) that generate data indicative of preference(s) for a particular user corresponding to a user profile of the allocation system(s) 102. Alternatively or additionally, in some embodiments, the external data system(s) 106 include item management system(s) that provide information regarding available item data object(s) from which the allocation system(s) 102 may select.

In some embodiments, one or more of the external data system(s) 106 embody intelligent agent system(s) with which the allocation system 102 is communicable. The intelligent agent system(s) may provide and/or facilitate offers for particular electronic item representations with which a user may transact, and/or facilitate bidding of such offers for transaction(s) associated with electronic item representations at variable true values based on a variable allocation of adjustment units. In this regard, based on the transactions facilitated through the allocation system 102 and/or directly between users associated with user profiles and the intelligent agent system(s), user behaviors, preferences, and subjective values regarding adjustment units are determinable and updateable as transactions continue to be initiated.

FIG. 2 illustrates a block diagram of an example allocation modeling apparatus that may be specially configured in accordance with at least some example embodiments of the present disclosure. In some embodiments, the allocation system(s) 102 and/or a portion thereof is embodied by one or more computing system(s), such as the allocation modeling apparatus 200 as depicted and described in FIG. 2. The allocation modeling apparatus 200 includes processor 202, memory 204, input/output circuitry 206, communications circuitry 208, model maintenance circuitry 210, and model application circuitry 212. In some embodiments, the allocation modeling apparatus 200 is configured, using one or more of the sets of circuitry 202, 204, 206, 208, 210, and/or 212, to execute the operations described herein.

In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although components are described with respect to functional limitations, it should be understood that the particular implementations necessarily include the user of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the allocation modeling apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the allocation modeling apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the allocation modeling apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the allocation modeling apparatus 200, and/or one or more remote or "cloud" processor(s) external to the allocation modeling apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with selecting electronic item representation(s) for providing associated with a particular user profile (e.g., as proposed or recommended transaction(s)) and/or determining and/or outputting adjustment unit allocation(s) for a user profile and electronic item representation. In some embodiments, the processor 202 includes hardware, software, firmware, and/or a combination thereof, that selects and/or outputs one or more electronic item recommendation(s) for a particular user profile. In some embodiments, the processor 202 utilizes a specially designed and/or trained model (e.g., an item selection model) to perform such functionality in whole or in part. Additionally or alternatively, in some embodiments, the processor 202 includes hardware, software, firmware, and/or a combination thereof, that determines and/or outputs an adjustment unit allocation for a particular user profile and electronic item representation. In some embodiments, the processor 202 utilizes a specially designed and/or trained model (e.g., an allocating model) to perform such functionality in whole or in part.

In some embodiments, the allocation modeling apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

The communications circuitry 208 includes any means such as a device or circuitry embodied in either hardware or a combination of hardware and software that is configured to receive and/or transmit data from/to a network and/or any other device, circuitry, or module in communication with the allocation modeling apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the allocation modeling apparatus 200.

The model maintenance circuitry 210 includes hardware, software, firmware, and/or a combination thereof, that supports various functionality associated with configuring, training, and/or maintaining one or more model(s). For example, in some embodiments, the model maintenance circuitry 210 includes hardware, software, firmware, and/or a combination thereof, that aggregates an item selection training data set associated with an item selection model. Additionally or alternatively, in some embodiments, the model maintenance circuitry 210 includes hardware, software, firmware, and/or a combination thereof, that trains an item selection model based at least in part on the item selection training data set, for example such that the item selection model learns or is configured to select particular electronic item representation(s) a particular user profile is most likely to be interested in. Additionally or alternatively, in some embodiments, the model maintenance circuitry 210 includes hardware, software, firmware, and/or a combination thereof, that determines one or more model parameter(s) that define an item selection model.

In some embodiments, the model maintenance circuitry 210 includes hardware, software, firmware, and/or a combination thereof, that determines one or more model parameter(s) associated with an allocation model, and/or configures the allocation model based on such model parameter(s). In some embodiments, the one or more model parameter(s) includes a maximum value for a transaction associated with a particular user profile and/or electronic item representation, a minimum profit associated with a transaction (and/or one or more parameters derived therefrom, for example a maximum amount of electronic currency value a user profile is expected to initiate a transaction using that remains profitable), a skew parameter, and/or a plateau parameter, as described herein. In some embodiments, each of the one or more model parameter(s) defines one or more characteristics of the data model, for example defining a particular curve. In some embodiments, the skew parameter defines the rate at which the data model defining a curve increases, and/or the value at which the curve begins to plateau. Additionally or alternatively, in some embodiments, the plateau parameters define the particular allocation of adjustment units along which the curve plateaus (e.g., having a particular slope and/or increase rate below a particular threshold). Additionally or alternatively, in some embodiments the minimum profit is usable to determine a particular allocation of adjustment units at which the curve meets the minimum profit, and/or the maximum value is usable to determine a particular allocation of adjustment units at which the curve meets the maximum value.

In some embodiments, one or more of the model parameter(s) is/are determined based at least in part on aspects particular to a user profile, electronic item representation, and/or transaction. For example, in some embodiments, a data model is specially configured for a particular transaction such that the values represented by the data model are specific to the particular user profile engaging in the particular transaction for the particular electronic item representation. In this regard, in circumstances where particular user profiles are processed to generate transactions for the same electronic item representation, the data models for such user profiles nevertheless may differ based on different model parameters. Alternatively or additionally, in some contexts, certain aspects utilized to determine the data model (or specifically in some embodiments model parameters defining such data models) is shared amongst a group of user profile(s), transaction(s), and/or electronic item representation(s), for example where such groupings are determined and/or otherwise indicated by the embodiments as similar. In this regard, embodiments of the present disclosure utilize such data to efficiently and effectively generate specially configured and specific models efficiently, and can perform such generation even in circumstances where a particular user profile lacks sufficient historical training data associated with it to accurately configure a customized data model on its own. It will be appreciated, as described herein, that the variable values defining model parameters are set during training to configure the data model for accuracy with respect to a particular user profile, transaction, and/or electronic item representation.

In some embodiments, the data model is generated from one or more model parameters to embody a monotonic model that accurately determines a user's subjective perspective of value for a particular transaction based on a particular allocation of adjustment units associated with the user profile for the user, thereby inherently and accurately modeling the user's likelihood of accepting a transaction at a particular value defined by an adjustment unit allocation (e.g., embodying a particular allocation of adjustment units and/or electronic currency value for a particular transaction associated with a particular electronic item representation and user profile). An example data model defined by particular model parameters is depicted and described herein with respect to FIG. 7.

In some such embodiments, the model maintenance circuitry determines the one or more model parameter(s) based at least in part on electronic item transactability data corresponding to an electronic item representation, user profile data set associated with a particular user profile, and/or the like. Additionally or alternatively, in some embodiments, the model maintenance circuitry 210 includes hardware, software, firmware, and/or a combination thereof, that aggregates an allocation model training data set associated with an allocation model. Additionally or alternatively, in some embodiments, the model maintenance circuitry 210 includes hardware, software, firmware, and/or a combination thereof, that trains an allocation model based at least in part on the allocation training data set, for example such that the allocation model is configured to determine adjustment unit allocation(s) that meet particular goal criteria and/or maximize one or more goal parameters (e.g., a profit per transaction parameter, a likelihood of transaction initiation parameter, and/or the like). Additionally or alternatively, in some embodiments, the model maintenance circuitry 210 includes hardware, software, firmware, and/or a combination thereof, that maintains a data repository including historical data from the system, and/or aggregated from one or more external systems, utilized for configuring, training, testing, and/or validating one or more stored model(s).

In some embodiments, the model maintenance circuitry 210 includes a separate processor, specially configured field programmable gate array (FPGA), or a specially programmed application specific integrated circuit (ASIC).

The model application circuitry 212 includes hardware, software, firmware, and/or a combination thereof, that supports various functionality associated with utilizing one or more specially configured ad/or trained model(s) maintained by the allocation modeling apparatus 200. For example, in some embodiments, the model application circuitry 212 includes hardware, software, firmware, and/or a combination thereof, that generates and/or otherwise determines one or more electronic item representation(s) selected for providing associated with a particular user profile. In some such embodiments, the model application circuitry 212 includes hardware, software, firmware, and/or a combination thereof, that utilizes a specially configured item selection model to select the one or more electronic item representations for a particular user profile. In some embodiments, for example, one or more electronic item representation(s) are selected for providing as recommended transactions to a user associated with the particular user profile.

Additionally or alternatively, in some embodiments, the model application circuitry 212 includes hardware, software, firmware, and/or a combination thereof, that determines an adjustment unit allocation corresponding to a particular electronic item representation and user profile. In some such embodiments, the model application circuitry 212 includes hardware, software, firmware, and/or a combination thereof, that utilizes a specially configured allocating data model to determine an adjustment unit allocation corresponding to the particular electronic item representation and the user profile, for example based at least in part on a user profile data set, an adjustment unit count, electronic item transactability data, or any combination thereof. Additionally or alternatively, in some embodiments, the model application circuitry 212 includes hardware, software, firmware, and/or a combination thereof, that aggregates, receives, and/or otherwise identifies one or more portions of data for use with one or more model(s), for example a user profile data set for a particular user profile, an adjustment unit count, electronic item transactability data, and/or the like.

In some embodiments, the model application circuitry 212 includes a separate processor, specially configured field programmable gate array (FPGA), or a specially programmed application specific integrated circuit (ASIC).

Additionally or alternatively, in some embodiments, one or more of the sets of circuitries 202-212 are combinable. Alternatively or additionally, in some embodiments, one or more of the sets of circuitry perform some or all of the functionality described associated with another component. For example, in some embodiments, one or more of the sets of circuitry 202-212 are combined into a single module embodied in hardware, software, firmware, and/or a combination thereof. Similarly, in some embodiments, one or more of the sets of circuitry, for example the model maintenance circuitry 210 and/or model application circuitry is/are combined such that the processor 202 performs one or more of the operations described above with respect to each of these sets of circuitry.

Example Data and Computing Environments of the Disclosure

Having described example systems and apparatuses in accordance with the present disclosure, example data and computing environments in accordance with the present disclosure will now be discussed. It will be appreciated that data and/or computing environments are embodied in hardware, and/or software or firmware executing on specially configured hardware (e.g., executing one or more specially configured application(s) providing particular functionality). It will further be appreciated that data is capable of being embodied in any of a myriad of configurations, including as multiple discrete data values, as a single data object, as multiple data objects, as particular data values in memory and/or in particular known hardware storage location(s), and/or the like. In this regard, the particular data depicted and described herein in some embodiments is embodied in any of a myriad of forms sufficiently processable by the particular device storing such data and/or associated device(s) providing the functionality herein. Such data may similarly be stored in any of a myriad of repositories in any of a myriad of repository structures. Accordingly, the particular architecture of data transfer and storage as depicted and described is not to limit the scope and spirit of this disclosure.

FIG. 3 illustrates a visualization of an example data environment in accordance with at least some example embodiments of the present disclosure. The data environment includes a myriad of data values and elements stored in a myriad of data repositories accessible to and/or maintained by an allocation system 302. In some embodiments, the allocation system 302 is a specially configured implementation of the allocation system 102, for example embodied by the allocation modeling apparatus 200 as depicted and described with respect to FIG. 2.

The allocation system 302 maintains and/or accesses a user repository 308 that stores various data associated with one or more registered user profile(s). In some embodiments, for example, the user repository 308 includes user profile(s) 310 corresponding to each registered user of the allocation system 302. The user profile(s) 310 in some embodiments includes various user information identifying the user and/or characteristics thereof (e.g., biographical information) as well as user authentication credentials and/or other system-specific information associated therewith. In some embodiments, the user profile(s) 310 are accessed to authenticate a particular user, and/or provide and store information particular to that user. In some embodiments, each user profile of the user profile(s) 310 is associated with a particular user identifier.

The user repository 308 additionally includes user profile data set(s) 312. In some embodiments, the user profile data set(s) 312 includes a user profile data set associated with each user profile of the user profile(s) 310. In some embodiments, each user profile set includes data generated by the allocation system 302 and/or otherwise aggregated by the allocation system 302 as associated with the particular user profile. In some embodiments, the user repository 308 links a particular user profile and a particular user profile data set utilizing the user identifier for the user profile of the user profile(s) 310. In some embodiments, a user profile data set includes (without limitation) historical transactions initiated by the user profile, historical adjustment unit allocation count(s) for the user profile, demographic and/or biographical information associated with the user corresponding to the user profile, search history performed by the user profile, and/or the like.

The allocation system 302 maintains and/or accesses a data repository 314 that stores various data embodying and/or associated with one or more electronic item representation(s). In some embodiments, for example, the data repository 314 includes electronic item representation(s) 316. The electronic item representation(s) 316 in some embodiments correspond to electronically available or real-world items available for transacting with by user(s). Such item(s) may include good(s), experience(s), service(s), and/or the like. In some embodiments, the electronic item representation(s) 316 include or otherwise represent all item(s) available for transacting by one or more user profile(s), such as the user profile(s) 310. In some embodiments, additionally or alternatively, one or more user profile(s) are particularly able to transact only with a subset of the electronic item representation(s) 316. In some embodiments, each electronic item presentation of the electronic item representation(s) 316 is associated with at least an electronic item identifier that uniquely represents that electronic item representation identifier. The electronic item identifier may represent a unique instance of an electronic item identifier, or in some contexts a type of item (e.g., an airline ticket from NYC to LAX) in the circumstance where the particular corresponding item is fungible.

The data repository 314 additionally includes item data 318. In some embodiments, the item data 318 includes item details associated with one or more properties of an electronic item representation of the electronic item representation(s) 316. For example, item data for a particular electronic item representation in some embodiments includes an item name, an electronic item identifier, an item provider (e.g., a merchant), an item manufacturer, and/or the like. Additionally or alternatively, in some embodiments, the item data includes electronic item transactability data associated with the corresponding electronic item representation. In some embodiments, an electronic item representation embodies a single data object comprising the item data associated with said electronic item representation.

The allocation system 302 maintains and/or accesses a model repository 304 that stores various data embodying and/or associated with model(s) maintained by or otherwise accessible to the allocation system 302. For example, in some embodiments, the model repository 304 includes allocating data model(s) 306A. The allocating data model(s) 306A in some embodiments includes a particular allocating data model trained and/or specially configured corresponding to a particular user profile of the user profile(s) 310. In this regard, the allocating data model(s) 306A in some embodiments includes a particular allocating data model specially trained to maximize accuracy with respect to the corresponding user profile of the user profile(s) 310. Alternatively or additionally, in some embodiments, two or more user profile(s) of the user profile(s) 310 share an allocating data model of the allocating data model(s) 306A (e.g., user profile(s) sharing particular characteristic(s), trends in historical action, and/or the like). In some embodiments, two or more user profiles share an allocating data model in circumstances where such user profiles are determined similar by a system, for example the allocation system, based on one or more characteristics stored and/or otherwise known about each of the user profiles. In this regard, such shared allocating data models are usable to efficiently provide an accurate data model without subsequent generation and/or storage of another data model. Additionally or alternatively still, in some embodiments, such shared allocating data models are used in circumstances where a particular user profile lacks sufficient training data to configure a customized data model for that user profile, thus enabling use of an allocating data model likely to be accurate for the user profile despite this lack of useful training data. Additionally or alternatively, in some embodiments, the model repository 304 stores model parameters for each of the allocating data model(s) 306A, the model parameters embodying and/or utilized to configure each of the allocating data model(s) 306A.

In some embodiments the model repository 304 includes one or more model parameters embodying data model(s) for particular user profile(s). In some embodiments, the model parameter(s) define the type, shape, and/or values in the data model. Alternatively or additionally, in some embodiments, the model parameter(s) define particular relevant threshold values of intersection to be compared to a value provided by the data model at a various points along a curve. For example, in some embodiments, the model repository 304 stores skew parameter(s) and/or plateau parameter(s) defining a curve representing the subjective value of a particular transaction to a user associated with a particular user profile, and/or minimum profit and maximum value utilized to determine intersection points with such a curve at particular adjustment unit allocation(s), as described herein.

Additionally or alternatively, for example, in some embodiments the model repository includes electronic item selection model(s) 306B. The electronic item selection model(s) 306B, in some embodiments, includes a particular electronic item selection model corresponding to a particular user profile of the user profile(s) 310. In this regard, the electronic item selection model(s) 306B includes a particular electronic item selection model specially trained to maximize accuracy with respect to the corresponding user profile of the user profile(s) 310. Alternatively or additionally, in some embodiments, two or more user profile(s) of the user profile(s) 310 share an electronic item selection model of the electronic item selection model(s) 306B (e.g., user profile(s) sharing particular characteristic(s), trends in historical action, and/or the like). Additionally or alternatively, in some embodiments, the model repository 304 stores model parameters for each of the electronic item selection model(s) 306B, the model parameters embodying and/or utilized to configure each of the electronic item selection model(s) 306B.

In this regard, it will be appreciated that in some embodiments each user profile registered with and/or otherwise accessing the allocation system 402 is associated with its own specially configured model(s) specially trained to maximize accuracy with respect to that particular user profile. In some such embodiments, the model(s) particular to a user profile is/are trained or otherwise configured specially on data associated with that user profile. Alternatively or additionally, in some embodiments, the model(s) particular to a user profile is/are trained or otherwise configured specially on data associated with user profile(s) determined similar to the particular user profile being processed.

In some embodiments, particular data model(s) are trained in real-time and/or near-real-time for use with respect to a particular transaction. For example, in some embodiments, a transaction-specific allocating data model is configured for a particular transaction associated with a particular user profile and a particular electronic item representation. In some embodiments, the allocating data model in some such embodiments is configured specifically to determine an adjustment unit allocation to be utilized in generating an offer of the transaction to the user associated with the user profile. In such contexts, the real-time/near-real-time nature and expendability of such data model(s) is particularly advantageous to ensure that the data model functions accurately with respect to all aspects of a particular transaction. Additionally, in circumstances where such data model embodies a curve defined by particular model parameters, the efficient nature of determining such a data model enables configuration of the data model in real-time or near-real-time once a system determines to generate an offer for a particular transaction. Additionally, in some embodiments data model(s) need not be stored in circumstances where such model(s) are unlikely to be re-used and/or are readily able to be reconstructed.

FIG. 4 illustrates a visualization of example data relationships in accordance with at least some example embodiments of the present disclosure. Specifically, FIG. 4 illustrates one or more model(s) associated with distinct user profile(s), as maintained by an allocation system. For example, the allocation system 402 maintains user profile 406A associated with model(s) 404A, which in some embodiments are specially configured to maximize accuracy with respect to the user profile 406A in particular. Similarly, the allocation system 402 maintains the user profile 406B associated with model(s) 404B, which in some embodiments are specially configured with respect to the user profile 406B, and maintains the user profile 406C associated with the model(s) 404C, which in some embodiments are specially configured with respect to the user profile 406C. In some embodiments, the allocation system 402 maintains model(s) as associated with their corresponding user profile (or group of user profiles) based at least in part on the user identifier(s) corresponding to such user profile(s). For example, in some embodiments, the model(s) 404A are associated with a first user identifier corresponding to the user profile 406A, the model(s) 404B are associated with a second user identifier corresponding to the user profile 406B, and so on for any number of additional users.

In some such embodiments where user profiles are associated with specially trained model(s), the allocation system 402 retrieves the particular model(s) corresponding to the user profile when generating and/or outputting data particular to said user profile. For example, in circumstances where the allocation system 402 is to select and output electronic item representations for a particular user profile as recommended transaction(s), the allocation system 402 retrieves the appropriate item selection model corresponding to the user profile based at least in part on the user identifier corresponding to the user profile and utilizes the retrieved item selection model. Similarly, in a circumstance where the allocation system 402 is to determine and/or output an adjustment unit allocation for a particular electronic item representation and/or user profile, the allocation system 402 retrieves the appropriate allocating data model based at least in part on the user identifier corresponding to the user profile and utilizes the retrieved allocating data model. The allocation system may similarly utilize such a user profile identifier to identify the appropriate model to update for a particular user profile, and/or to identify particular data corresponding to a particular user profile for use in updating one or more model(s) associated with the user profile.

FIG. 5A illustrates a first example use of model(s) maintained by an allocation system in accordance with at least some example embodiments of the present disclosure. Specifically, FIG. 5A illustrates use of an electronic item selection model for outputting one or more selected electronic item representation(s) 506. In some embodiments, an allocation system maintains an electronic item selection model 504 for a particular user profile or multiple user profile(s), and utilizes the electronic item selection model 504 to select one or more electronic item representation(s) 506 that are determined as likely to be transacted with by the user corresponding to the user profile.

In some embodiments, the allocation system applies various item selection input data 502 to the electronic item selection model 504 to produce the selected electronic item representation(s) 506. The item selection input data 502 in some embodiments includes a set of available electronic item representations possible for selection. In some embodiments, the item selection input data 502 includes user profile data associated with the corresponding user profile for which electronic item representations are to be selected. In this regard, the electronic item selection model 504 is configured to transform and/or otherwise process the item selection input data 502 to generate the selected electronic item representation(s) 506.

FIG. 5B illustrates a second example use of model(s) maintained by an allocation system in accordance with at least some example embodiments of the present disclosure. Specifically, FIG. 5B illustrates use of an allocating data model for outputting one or more adjustment unit allocation(s) 556. In some embodiments, an allocation system maintains an allocating data model 554 for a particular user profile or multiple user profile(s), and utilizes the allocating data model 554 to determine one or more adjustment unit allocation(s) 556 for transactions with particular electronic item representation(s) that are determined to likely be of interest to or otherwise transacted with by the user corresponding to the user profile.

In some embodiments, the allocation system applies various allocation input data 552 to the allocating data model 554 to produce the adjustment unit allocation(s) 556. In some embodiments, an adjustment unit allocation represents an amount of available adjustment unit(s) for the user profile to allocate towards a particular transaction associated with a particular electronic item representation. The adjustment unit allocation determined by the allocating data model 554 in some embodiments is determined to maximize a particular goal parameter, for example maximize the likelihood that the user initiates the transaction while satisfying minimum profitability threshold(s).

In some embodiments, the allocation input data 552 embodies a plurality of distinct data set(s) and/or data value(s). For example, in some embodiments, the allocation input data 552 includes at least an adjustment unit count available for the particular user profile being processed. In some embodiments, the allocation input data 552 includes electronic item transactability data for the particular electronic item representation being processed. In some embodiments, the allocation input data set 552 includes a user profile data set for the user profile being processed. In some embodiments, some or all of the allocation input data 552 is utilized to update and/or otherwise maintain the allocating data model in real-time or near-real time (e.g., milliseconds, seconds, or minutes) before the allocating data model 554 is utilized to generate one or more adjustment unit allocation(s) 556.

FIG. 6 illustrates an example of outputting adjustment unit allocation data in accordance with at least some example embodiments of the present disclosure. Specifically, FIG. 6 illustrates an allocation system 602 generating and outputting of adjustment unit allocation data to a user device associated with a particular user profile.

As described herein, in some embodiments, the allocation system 602 retrieves, receives, and/or otherwise identifies input data 604. The input data may embody one or more sets of input data for particular model(s). For example, in some embodiments, the allocation system 602 receives input data 604 indicating a particular electronic item representation with which a user associated with a user profile has indicated an interest in transacting, such that selecting particular electronic item representation(s) for recommending is not performed. In some such contexts, the allocation system 602 receives other input data 604 embodying an allocation input data (for example, as described with respect to FIG. 5B) utilized to generate the adjustment unit allocation data 606 for the electronic item representation with which the user indicated an interest.

In other embodiments, the input data 604 includes item selection input data, for example as described with respect to FIG. 5A. In some such embodiments, the allocation system 602 processes at least a portion of the input data 604 to select one or more electronic item representation(s) to output to the user associated with a particular user profile, for example as recommendations with which the user is likely to interact based at least in part on their associated data, historical transactions, and/or the like. In some embodiments, the allocation system 602 then generates adjustment unit allocation data 606 for each of the selected electronic item representations (not depicted).

In some embodiments, upon generating the adjustment unit allocation data 606, the allocation system 602 outputs the adjustment unit allocation data 606 to a user device 608. The user device 608 may process the adjustment unit allocation data 606 for any of myriad of purposes. In some embodiments, the user device 608 processes the adjustment unit allocation data 606 to perform one or more automatic determination(s), initiate one or more process(es) based on the adjustment unit allocation data 606, and/or the like. In some embodiments, the user device 608 generates and/or renders one or more specially configured user interface(s) based at least in part on the adjustment unit allocation data 606. For example, in some embodiments, the allocation system 602 outputs the adjustment unit allocation data 606 to cause rendering (via the user device 608) of one or more user interface(s) that include particular electronic item representations selected as recommendation(s), indicated in received input data, and/or the like. For example, in some embodiments, the adjustment unit allocation data 606 causes rendering of a specially configured user interface that indicates the adjustment unit allocation represented by the adjustment unit allocation data 606 prominently, such that the user is most likely to see and/or engage first with interface element(s) corresponding to initiating a transaction using the adjustment units indicated via the adjustment unit allocation. For example, in a circumstance where the adjustment unit allocation indicates that 1000 adjustment units maximizes a particular goal parameter based at least in part on maximizing likelihood of transaction initiation while simultaneously maximizing profit from a transaction, the user device 608 in some embodiments renders a user interface prominently featuring (e.g., in largest size, different colors, a different location in the user interface, and/or the like) interface elements for initiating the transaction for the particular electronic item representation utilizing 1000 adjustment units. In some embodiments, alternative options for initiating the transaction (e.g., utilizing less adjustment units and/or more adjustment units) are similarly rendered in the user interface, but with less prominence (e.g., smaller in size, with different colors, in a different location, and/or the like). Non-limiting example interfaces renderable via a client device are described herein with respect to FIGS. 10 and 11.

Example Depictions of Statistical Underpinning of the Disclosure

Having described example systems and apparatuses, and computing and data environments, in accordance with the present disclosure, the statistical underpinnings of the disclosure will now be discussed. Several aspects of the statistical underpinnings are described herein as well as depicted in the accompanying figures. It will be appreciated that the statistical underpinnings detail how embodiments of the present disclosure improve (and in some instances, maximize) accuracy of particular determination(s) described herein. Embodiments of the present disclosure rely on these statistical underpinnings, and integrate particular technological features and implementations that provide the various technical advantages described herein, including those described in the Overview section herein. Accordingly, embodiments of the present disclosure integrate any statistical underpinnings into technically advantageous implementations over existing system(s), implementation(s), and/or the like.

FIG. 7 illustrates a graphical depiction of model parameters generated in accordance with at least some example embodiments of the present disclosure. Specifically, FIG. 7 illustrates a graphical depiction of particular model parameters generated for use in specially configuring an allocating data model in accordance with the present disclosure. In some embodiments, one or more of the model parameter(s) are definable based at least in part on the plotted relationship graph between a total item value for a particular electronic item representation and an adjustment unit allocation. As depicted, the adjustment unit allocation is defined on a scale from 0 to 1, where 0 represents no use of adjustment units available for a particular user profile for a particular electronic item representation and 1 represents use of all adjustment units available to a particular user profile during the transaction for the particular electronic item representation.

The depicted graphical representation in FIG. 7 includes the plot line 700, indicating the transformation the total item value to a particular user corresponding to a particular user profile as the adjustment unit allocation increases from a minimum allocation (e.g., 0.0 or no adjustment units as depicted) to a maximum allocation (e.g., 1.0 or all adjustment units as depicted). In one example context, the adjustment units embody bank reward credit points allocable towards future transaction(s) and/or statement purchase(s). The plot line 700 is derived from various assumptions, including that use of adjustment units is preferred over electronic currency alternatives (e.g., paying with dollars), that use of electronic currency requires value perceived by the user, that the subjective value of electronic currency as opposed to adjustment units is non-linear, and that the subjective value of adjustment unit(s) to a user generally follows a non-linear elastic relationship (e.g., having an adjustment unit count higher than the amount required for a particular transaction reduces the value of subsequent adjustment allocation points to a user, and similarly having an adjustment unit count lower than a particular threshold or lower than a particular proportion of the required amount of adjustment units to initiate the transaction using adjustment units alone increases the subjective value of adjustment units to a user. The plot line 700 indicates such assumptions, as the total item value subjective to a particular user increases greatly as the adjustment unit allocation is closer to zero (e.g., proportion of the user points is low), then the slope decreases greatly along the plateau parameter 702 (indicating a decrease in the subjective value in the user of adjustment units) until a particular point as the adjustment unit allocation nears 1.0 (e.g., all of the adjustment units associated with a user profile). It should be appreciated that the subjective total item value as compared to use of adjustment unit allocation for a particular user (e.g., as a proportion of the adjustment unit count associated with the particular user profile) may generally follow this model trajectory, the particular rate at which a user profile deems the value of adjustment units to increase, and/or the adjustment unit allocation(s) at which such increases begin, plateau, and/or begin again may differ for each user.

In this regard, the particular plot line 700 of the graph depicted in FIG. 7 may be defined by various parameters. In one example context, the plot line 700 is generated for a particular user profile associated with a particular adjustment unit count (e.g., a number of available adjustment units, defined as the value b). For a particular electronic item representation, a base total item value 706 may be defined, for example where the base total item value 706 embodies a minimum total item value associated with an electronic item representation at which an electronic item representation is made available for transacting assuming a circumstance where the user profile being processed includes sufficient adjustment units to initiate a transaction for the particular electronic item data object without use of additional electronic currency (e.g., the minimum totaling at least the costs associated costs associated with generating the item represented by the electronic item representation, transacting associated with the item, transporting the item, and/or the like, as well as other costs associated with transacting associated with the electronic item representation), the base total item value 706 referred to as the value p. In some embodiments, a bound u is determined where u>0, and where u corresponds to a particular electronic item representation (or category associated therewith) that defines a maximum value excess threshold that a transaction can product (e.g., a maximum profit). In one example context, a u of 0.1 (or 10%) for example embodies a 10% maximum profit on a transaction of a particular electronic item representation.

In this regard, the maximum total item value 708 specifically refers to the maximum value for the electronic item value in a circumstance where a user profile is associated with sufficient adjustment units to initiate the transaction without electronic currency usage. The true maximum total item value subjective for a particular user at different adjustment unit counts is thereby determinable based at least in part on the available adjustment units b and bound u. In this regard, the maximum total item value at a particular balance is defined by the plot line 700. In one example embodiment, for example, the maximum total item value 708 is determinable based on the multiple of p*(1+u), totaling 110 given the example values of p and u in the above example. Based on the assumptions described above, the adjustment unit count represented as b for a particular user profile is usable to determine the actual maximum total item value at different allocations of adjustment units relative to the value p. In this regard, circumstances where b is significantly larger than p (e.g., b>>p by a particular threshold multiplier), additional adjustment units do not increase the subjective total value of the electronic item representation as opposed to circumstances where b is equal or approximately equal to p.

Additional parameters are definable to set particular minimum profit(s) on a transaction, for example a rate r where r<u that defines the minimum profit expected to result from a transaction based on the use of adjustment units. The minimum profit is a differential on top of the baseline p, the minimum profit defined as MINP. An example calculation of MINP with respect to the depicted values is represented as MINP 710, with an r=0.1.

In this regard, the fixed bound a defined by $$\hat{u} = \text{MIN}(u, \frac{b}{p*(1+\text{MINP})} - 1)$$

is determinable as an updated bound for the actual maximum value in circumstances where the adjustment unit count is not sufficient to initiate the transaction for a particular electronic item representation without use of electronic currency at a value of p*(1+u). In this regard, the actual maximum value, represented as MAXP, in such circumstances is determinable based on the equation $$\text{MAXP} = p + p*\hat{u}*(1 - \frac{p}{b}).$$

In some embodiments, MAXP is maintained as a model parameter for deriving the allocating model for the particular user profile.

FIG. 8 illustrates a graphical visualization of relationships between point-based value bound and adjustment unit count in accordance with at least some example embodiments of the present disclosure. In this regard, the graph depicts different values of a point-based value bound, defined as MAXP described above, for different profit rates r. Specifically, plot line 802 depicts a plot of MAXP at various adjustment unit counts for a particular user profile at a value of r=1 (or 100%), plot line 804 depicts a plot of MAXP at various adjustment unit counts for the particular user profile at a value of r=0.2 (or 20%), and plot line 806 depicts a plot of MAXP at various adjustment unit counts for the particular user profile at a value of r=0.1 (or 10%). Based on the above scenario, MAXP can be determined as the value b representing the adjustment unit count for the user profile fluctuates. From these depicted plot lines, as b approaches infinity the rate r approaches û. It will be appreciated that FIG. 8 is depicted with respect to an electronic item representation having a p value of 100, however in other contexts p may be equal to any other value based on the base cost determined for the electronic item representation.

In some embodiments, u is assumed as a constant. In other embodiments, u is estimated based at least in part on a history of transactions. For example, in some embodiments U∈[0, 1] is defined embodying the mean adjustment unit allocation (in proportion to the adjustment unit count for the user profile). In some embodiments, u can be updated as a number of historical transactions is determined, for example where l represents the number of historical transactions where the adjustment unit allocation utilized to initiate the transaction is less than or equal to U, and h represents the number of historical transactions where the adjustment unit allocation utilized to initiate the transaction is more than U. Accordingly, u can be continuously updated based on the estimate of $$u_{new} = u + \left(1 + \frac{h-l}{h+l}\right).$$

Returning to FIG. 7, a skew parameter 704 is similarly determinable. The skew parameter 704 represents a value for a point at which a plateau exists in the graphed plot line (e.g., a slope below a particular threshold slope). The lower the skew parameter value (e.g., at which the plateau exists), the more value that needs to be perceived by a particular user associated with a user profile to utilize electronic currency instead of adjustment units to initiate a transaction. In some embodiments, the skew parameter is assigned a value ranging from [−1, 1], inclusive.

In some embodiments a default skew parameter value is assigned. In some embodiments, a default skew parameter value of −0.5 is assigned, to attribute an assumption that the skew parameter value for a particular user corresponding to a user profile is non-symmetric and slightly biased towards the negative. In some embodiments, in circumstances where historical data associated with a particular user profile is known (e.g., a user profile data set is determinable), the skew parameter value is generated as described further herein.

In some embodiments, a previously determined skew parameter value is tracked as the skew for a particular user profile is updated. For example, the previous skew parameter may be referred to as y, with the default value of y=−0.5 in a circumstance where historical information associated with a profile is not determinable (e.g., the user profile is new). In some embodiments, the allocation system (e.g., embodied by the allocation modeling apparatus 200) continuously updates the skew value parameter as new data associated with the user profile is received, retrieved, and/or otherwise identified. In some embodiments, the skew parameter value is modeled as a Bayesian Beta model that, given n transactions associated with a user profile of the form $t_1$, $t_2$, $t_3$, ... $t_n$, where $t_i \in [0, 1]$, inclusive representing an adjustment unit allocation comprising a percentage of the value for an electronic item representation transacted for utilizing adjustment units. An example Bayesian Beta model for determining the skew parameter value accordingly is as follows:

$$\text{skew\_parameter\_value} = \frac{2\alpha}{\alpha + \beta} - 1$$

$$\alpha = \hat{a}\sqrt{n+1} + \sum_{i=1}^{n} t_i$$

$$\beta = \hat{\beta}\sqrt{n+1} + \sum_{i=1}^{n} (1-t_i)$$

In such formulaic model(s), the hyperparameters $\hat{a}$ and $\hat{\beta}$ are determinable by:

$$\hat{a} = \text{MAX}(1, \frac{2}{1-y} - 1)$$

$$\hat{\beta} = \text{MAX}(1, \frac{2}{1+y} - 1)$$

Such a model for determining the skew parameter value is fully adaptive, such that a user's preference for utilizing adjustment units in lieu of electronic currency to initiate a transaction, and/or alternatively the user's preference for utilizing electronic currency in lieu of adjustment units to initiate transactions, is determinable as transaction data associated with the user profile is identified. Based on the assumption that a natural bias exists for utilizing adjustment units, however, the model is biased towards the negative, such that shifting the model upwards (e.g., towards a preference for utilizing electronic currency) is more difficult. As historical data accumulates, the model remains adaptive and can withstand sudden switches in behavior with significant inertia (e.g., thus continually accurately representing the user's preference for using adjustment unit(s) to initiate transaction(s)).

FIG. 9 illustrates a graphical visualization of relationships between skew parameter value for a particular user profile and transactions initiated associated with the particular user profile in accordance with at least some example embodiments of the present disclosure. As illustrated, the graph depicts various skew parameter values as the number of historical transactions initiated associated with a particular user profile is identified under different conditions. Specifically, the graph in FIG. 9 depicts the changes in the skew parameter value associated with a first user profile that initiates all transactions utilizing an adjustment unit allocation that utilizes no adjustment units (e.g., only electronic currency) as depicted by the plot long 906, a second user profile that initiates transactions using a random adjustment unit allocation (e.g., randomly determining the number of adjustment units used to initiate a transaction with the remainder in electronic currency) as depicted by the plot line 904, and a third user profile that initiates transactions only utilizing adjustment unit allocations that utilize only adjustment units. As the number of transactions increases associated with these user profiles, the skew parameter value associated therewith shifts accordingly to reflect the user's most up-to-date preference for utilizing adjustment units to initiate transaction(s).

Returning to FIG. 7, plateau parameter 702 are similarly determinable for the particular user profile. In some embodiments, the plateau parameter 702 comprises a pair of plateau parameter values ($P_l$, $P_h$), where $0 < P_l \leq P_h < 1$. The two plateau parameter values define the horizontal endpoints of the plateau, for example defined where the plot line 700 comprises a slope below a particular slope threshold. In this regard, the plateau parameter values define how linearized or smooth the plot line 700 is for a particular user profile, and similarly quickly the value of adjustment units regains value once a drop-off point is reached.

$P_l$ embodies a value in how significantly a user associated with a user profile subjectively values adjustment units available to the user profile. In some embodiments, a low value (e.g., closer to zero) of $P_l$ signifies a raid depreciation of the value of the adjustment units available to a user profile towards the midpoint established by the skew parameter value described herein. Alternatively, a high value of $P_l$ indicates greater subjective value attributed to the adjustment units by the user associated with the user profile.

Similarly, $P_h$ embodies a value in how significantly a user associated with a user profile subjectively values changes as the allocation of adjustment units increases. A high value of $P_h$ (e.g., closer to one) signifies a rapid appreciation of electronic currency towards the midpoint established by the skew parameter value. In one example context, a high value of $P_h$ is determined for user profiles for which historical transactions are often initiated utilizing electronic currency instead of available adjustment units. In some such contexts, the value of $P_h$ defines the subjective "power" a user attributes to use of electronic currency rather than adjustment units.

In one example context, $q_p. \in [0, 1]$, inclusive, which defines the quantile at which the point of balance of the user profile is with respect to the entire population of user profiles. In some such contexts, the quantile at which the user profile is located is determinable utilizing a normal cumulative distribution function (CDF) to estimate such values. Similarly, $q_c$. in some such contexts denotes the quantile at which the total expenditure of electronic currency for a user profile is located with respect to the entire population of user profiles. Accordingly, in some such embodiments, the plateau parameter values $P_l$, $P_h$ are determinable based on the following formulas:

$$P_l = 0.5*(1 - q_p)$$

$$P_h = 1 - (0.5 * q_c)$$

Utilizing the relative placement of a user profile with respect to the entire population of user profiles, the model is affected by information regarding the complete universe of user profiles interacting via the system. In some embodiments, for $P_l$, the parameter value approaches the skew parameter value and MAXP value to increase profitability of an initiated transaction utilizing adjustment units while simultaneously minimally reducing the likelihood that the user associated with the user profile does not initiate the transaction. In this regard, user profiles that are associated with a relatively high number of adjustment units are encouraged to utilize them, as such adjustment units are assigned a relatively high value. Further, with respect to $P_h$, the users that often initiate transactions utilizing electronic currency rather than adjustment units are similarly moved towards the center such that those with higher adjustment unit usage can perceive more value.

In this regard, in some embodiments the allocation modeling apparatus 200 generates, configures, and/or otherwise maintains an allocation model based at least in part on one or more of the described model parameters. In some embodiments, the allocation modeling apparatus 200 determines one or more particular parameter values that are utilized to subsequently determine the relevant model parameters for configuring an allocation model for a particular user profile. For example, for each user profile, the allocation modeling apparatus 200 may generate an adjustment unit count (e.g., in number of points and/or corresponding value in a particular electronic currency, for example USD), a total number of transactions performed by and/or otherwise initiated associated with the user profile, the sum of the transactional proportions in adjustment units versus electronic currency, and the total electronic currency value expended to perform the total number of transactions. Similarly, for all user profiles, the allocation modeling apparatus 200 in some embodiments generates a mean and standard deviation of the adjustment unit count for all user profiles, and the mean and standard deviation of total electronic currency value expended by user profiles in initiated transactions. Additionally, for each electronic item representation for which an adjustment unit allocation is to be generated (e.g., to offer initiation of a transaction associated with the electronic item representation), the allocation modeling apparatus 200 generates the minimum profit value associated with the electronic item representation and the maximum profit rate associated with the electronic item representation. Utilizing such statistical values, the allocation modeling apparatus 200 is capable of defining the one or more model parameters embodying and/or utilized to configure the allocation model for the particular user profile and transaction associated with the particular electronic item representation.

Example User Interfaces of the Disclosure

Having described example systems and apparatuses, computing and data environments, and statistical underpinnings in accordance with the present disclosure, example user interfaces of the disclosure will now be discussed. In some embodiments, data transmitted from an allocation system (e.g., embodied by the allocation modeling apparatus 200) facilitates rendering of one or more of the user interface(s) via a user device associated with a user profile. In other embodiments, an allocation system causes rendering of the user interface(s) to a display associated with the allocation system itself. It will be appreciated that one or more user interface(s) may be rendered to enable a user associated with the user profile to view and/or interact with the user interface, for example by engaging or otherwise interacting with user interface elements in the user interface(s).

FIG. 10 illustrates an example graphical user interface including interface elements associated with an adjustment unit allocation for an electronic item representation in accordance with at least some example embodiments of the present disclosure. Specifically, FIG. 10 depicts an example graphical user interface 1000 ("interface 1000"). The interface 1000 includes an interface element 1002 indicating an electronic item representation with which a user can initiate a transaction. Specifically as indicated, the electronic item representation corresponds to a new computer available for purchase. In some embodiments, the electronic item representation is selected as recommended for transacting with by an associated user profile. For example, an allocation system (e.g., embodied by the allocation modeling apparatus 200) in some embodiments determines the electronic item representation as likely to be of interest and/or otherwise likely to be transacted with by the user corresponding to the particular user profile, and thus displays the corresponding interface element 1002. Alternatively or additionally, in some embodiments the electronic item representation is selected by the user manually (e.g., when browsing through a list of available electronic item representations for purchase), and the allocation modeling apparatus 200 causes rendering of the corresponding interface element 1002 in response to such a selection by the user.

The interface 1000 further includes an available points interface element 1004 indicating the adjustable points count associated with the user profile being processed. The adjustable points count in some embodiments is retrieved based on a user that is currently logged in or otherwise authenticated to interact with an allocation system (e.g., embodied by an allocation modeling apparatus 200) for purposes of facilitating transaction(s) with electronic item representations. As illustrated, the user profile with which an authenticated session is established currently is associated with an adjustable point count of 12,352.

The interface 1000 further includes a recommended transaction initiation interface element 1006. The recommended transaction initiation interface element 1006 indicates a recommended amount of adjustment units to be utilized to initiate the transaction in a manner that increases and/or maximizes one or more goal parameters. In this regard, the amount of adjustment allocation points recommended to be allocated towards the transaction for the electronic item representation embodying the computer (e.g., depicted in the interface element 1002) in some embodiments is defined by an adjusted point allocation generated by the adjustment allocation system. As illustrated, for example, the recommended transaction initiation interface element 1006 indicates that the user can engage the recommended transaction initiation interface element 1006 to initiate a transaction for the electronic item representation utilizing an adjustment unit allocation determined by the allocation system, specifically of 10,000 adjustment units and a remaining electronic currency value corresponding to $150.00. In this regard, in some embodiments the adjustment unit allocation for displaying via the recommended transaction initiation interface element 1006 is received from the allocation system (e.g., embodied by the allocation modeling apparatus 200) as maximizing or increasing one or more goal parameter(s) (e.g., likelihood that the user associated with the user profile initiates the transaction, maximum profit for the entity associated with the electronic item representation and/or facilitating the transaction, and/or the like).

In some embodiments, the interface 1000 further includes a plurality of additional transaction initiation interface elements. For example, as illustrated, the interface 1000 further includes additional transaction initiation interface elements 1008A, 1008B, and 1008C (collectively "additional transaction initiation interface elements 1008"). Each of the additional transaction initiation interface elements 1008 is associated with an alternative adjustment unit allocation from that associated with the recommended transaction initiation interface element 1006. In this regard, in some contexts these alternative adjustment unit allocation(s) represent arbitrary, default, and/or randomly determined adjustment unit allocation(s) that are not recommended as increasing or maximizing a particular target goal metric. For example, in some embodiments, each additional transaction initiation interface 1008 is associated with an adjustment unit allocation that is not determined as likely to maximize the profit for the entity facilitating the transaction, may not be determined as more likely to be initiated by the user associated with the user profile, and/or the like. In this regard, such additional transaction initiation interface elements 1008 in some embodiments provide backup options that a user may prefer in circumstances where the allocating model generates an inaccurate value and the recommended adjustment unit allocation associated with the recommended transaction initiation interface element 1006 is not preferred by the user nor used to initiate the transaction. In some embodiments, the recommended transaction initiation interface element 1006 is visually distinguished from other, additional transaction initiation interface elements 1008. For example, in some embodiments, the recommended transaction initiation interface element 1006 is configured to be bigger in size, a different color, animated, and/or otherwise visually presented in a manner that is more eye-catching and/or accessible to a user interacting with the interface 1000.

In some embodiments, one or more alternative adjustment unit allocations is/are predetermined for rendering via the interface 1000. For example, in some embodiments, the interface 1000 is rendered further comprising at least a first additional interface element associated with a first alternative adjustment unit allocation. The first alternative adjustment unit allocation in some embodiments is predefined to correspond to use of no adjustment allocation points to initiate a transaction associated with the electronic item representation (e.g., utilizing all electronic currency instead). Alternatively or additionally, in some embodiments, the interface 1000 is rendered further comprising at least a second additional interface element associated with a second alternative adjustment unit allocation corresponding to use of only adjustment allocation points to initiate the transaction (e.g., utilizing no electronic currency). It will be appreciated that, in this regard, embodiments are configurable to display any number of interface elements associated with alternative adjustment unit allocations, and similarly such alternative adjustment unit allocations may be predefined at particular values (e.g., use of all or no adjustment units), determined utilizing the allocation model further, and/or the like. Such alternative options for initiating a transaction may similarly be provided in user interfaces where multiple electronic item representations are depicted, for example as described herein with respect to FIG. 11.

FIG. 11 illustrates an example graphical user interface including interface elements associated with an adjustment unit allocation for each electronic item of a plurality of electronic items recommended for a particular user in accordance with at least some example embodiments of the present disclosure. Specifically, FIG. 11 depicts an example graphical user interface 1100 ("interface 1100"). The interface 1100 includes a plurality of interface elements associated with a plurality of electronic item representations.

As illustrated, the interface 1000 includes interface element 1104A depicting a first electronic item representation corresponding to a new computer, interface element 1104B depicting a second electronic item representation corresponding to a new phone, and interface element 1104C depicting a third electronic item representation corresponding to a new monitor. In some example contexts, the user interface 1100 includes interface elements associated with a plurality of selected electronic item representations, the selected electronic item representations determined as likely to be of interest and/or transacted with by a particular user profile. In some such embodiments, the selected electronic data objects are determined by an allocation system (e.g., embodied by an allocation modeling apparatus 200) utilizing an item selection data model. For example, in some embodiments, the allocation system utilizes historical profile data associated with the particular user profile being processed to select particular electronic item representations that the particular user profile is determined likely to be interested in and/or otherwise transact with (e.g., based on their interests, previous transaction(s), and/or the like derived from the user profile data set). For example, the depicted electronic item representations in some embodiments are selected as associated with an interest in technology determined by the allocation system (or an associated system) for the user associated with the user profile currently accessing the allocation system via the client device.

In other embodiments, the electronic item representations depicted via the user interface 1100 are determined arbitrarily, for example without determining any recommendations or selecting particular electronic item data objects. In some example contexts, the allocation system provides adjustment unit allocations for electronic item recommendation(s) in the order that such electronic item representation(s) are determined via a search and/or browse function, and/or in any arbitrary order that the electronic item representation(s) are otherwise retrieved.

Each depicted electronic item representation is similarly associated with a description interface element that provides a brief description of the electronic item representation for which a user can initiate a transaction. For example, the first electronic item representation is associated with a description interface element 1106A comprising text data indicating the user can redeem for a new computer. Such data depicted in the description interface element 1106A in some embodiments is determined based on item data associated with and/or stored in the electronic item representation associated therewith (e.g., a description text value). Similarly, the second electronic item representation is associated with a description interface element 1106B comprising text data indicating the user can redeem for a new phone, and the third electronic item representation is associated with a description interface element 1106C comprising text data indicating the user can redeem for a new monitor.

In some embodiments, the allocation system generates an adjustment unit allocation that is recommended and/or otherwise for each electronic item representation as increasing or maximizing a particular goal metric (e.g., profit). As illustrated, for example, the first electronic item representation is associated with a transaction initiation interface element 1108A, the second electronic item representation is associated with a transaction initiation interface element 1108B, and the third electronic item representation is associated with a transaction initiation interface element 1108C. Each transaction initiation interface element is associated with a different adjustment unit allocation. For example, as illustrated, transaction initiation interface element 1108A is associated with an adjustment unit allocation of 10,000 adjustment units and $150.00 value of electronic currency to initiate a transaction for the first electronic item representation. In this regard, this adjustment unit allocation in some embodiments is determined by an allocation system (e.g., embodied by an allocation modeling apparatus 200) as increasing or maximizing a particular goal metric utilizing an allocation model. Similarly, transaction initiation interface element 1108B is associated with an adjustment unit allocation of 8,000 and $239.99 of electronic currency to initiate a transaction for the first electronic item representation. This adjustment unit allocation in some embodiments is determined by the allocation system for the second electronic item representation and the particular user profile. Further as illustrated, the transaction initiation interface element 1108C is associated with an adjustment unit allocation of 2,000 adjustment units and $0.00 of electronic currency. In this regard, in some embodiments the allocation system (e.g., embodied by the allocation modeling apparatus 200) generates each of the adjustment unit allocations for the particular electronic item representations as recommended for the particular corresponding electronic item representation and associated user profile to maximize one or more goal metrics. The allocation system subsequently in some embodiments causes rendering of the adjustment unit allocations to the interface 1100 such that the user associated with the user profile may view the adjustment unit allocations and initiate one or more of such transactions with a higher likelihood of success and/or that produce higher contributions towards goal metrics as compared to arbitrarily and/or otherwise determined adjustment unit allocations (or other offers generally) to transact for electronic item representations.

In some embodiments, the allocation model generated matches the minimum profit sought by the allocation system, as defined by a static value, determined for the particular electronic item representation, and/or otherwise determined, with a maximum discount per adjustment unit (e.g., MAXC) that the user associated with the user profile is likely to accept (assuming the user has sufficient electronic currency to cover the remaining value). The MAC value in some such embodiments is determinable utilizing a non-linear optimization algorithm that identifies the point of coincidence on the generated plot line defined by the model.

In some embodiments, the user interface(s) as depicted and/or described comprise such interface element(s) offering particular transaction(s) to a user associated with a particular user profile at defined value(s). In this regard, in some such embodiments the value associated with a transaction is determinable based at least in part on the adjustment unit allocation(s) associated with each offer. In some embodiments, an allocating data model utilized to generate one or more adjustment unit allocation(s) is maintained for a short life span tied to generation and/or maintenance of the corresponding user interface within which an offer for a transaction associated with the adjustment unit allocation generated utilizing the data model is included. For example, in some embodiments an allocating data model is utilized to determine an adjustment unit allocation and generate a transmission that causes rendering of a particular user interface including one or more user interface element(s) representing an offer for a particular transaction for a particular electronic item representation at a value defined by the adjustment unit allocation. In some such embodiments, the allocating data model is maintained by the allocating system only until the user interface is generated and/or the transmission for causing rendering of such a user interface is indicated received. Such embodiments enable conservation of memory resources that would otherwise be dedicated towards maintaining the data model. In some embodiments, the allocating data model is maintained by the allocating system until the user interface including the offer for a transaction having a value defined by the generated adjustment unit allocation is terminated. In this regard, once the transaction is no long available to the user associated with the user profile for initiating (e.g., by terminating the user interface, terminating an associated software application altogether, terminating an authenticated session associated with the user profile, and/or the like) the data model is similarly terminated. Such embodiments enable the data model to be maintained in circumstances where it is usable to reconfigure, adjust, and/or otherwise initiate the transaction while the user interface is available, and conserve computing resources once the user interface is no longer available.

Example Processes of the Disclosure

Having described example systems and apparatuses, computing and data environments, statistical underpinnings, and example user interfaces in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 12 illustrates a flowchart depicting example operations of an example process for generating an adjustment unit allocation in accordance with at least some example embodiments of the present disclosure. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the allocation modeling apparatus 200 alone or in communication with one or more other component(s), device(s), system(s), and/or the like. In this regard, in some such embodiments, the allocation modeling apparatus 200 is specially configured by computer-coded instructions (e.g., computer program instructions) stored thereon, for example in the memory 204 and/or another component depicted and/or described herein and/or otherwise accessible to the allocation modeling apparatus 200, for performing the operations as depicted and described. In some embodiments, the allocation modeling apparatus 200 is in communication with one or more external apparatus(es), system(s), device(s), and/or the like, to perform one or more of the operations as depicted and described. For example, the allocation modeling apparatus 200 in some embodiments is in communication with a user device and/or one or more external data systems. For purposes of simplifying the description, the process 1200 is described as performed by and from the perspective of the allocation modeling apparatus 200.

The process 1200 beings at optional operation 1202. At optional operation 1202, the allocation modeling apparatus 200 includes means, such as the model maintenance circuitry 210, model application circuitry 212, communications circuitry 208, input/output circuitry 206, processor 202, and/or the like, or a combination thereof, to receive an indication indicating a user identifier for which at least one adjustment unit allocation is to be processed. In some embodiments, the indication is received in response to a user authenticating a particular user profile having a particular user identifier, for example to begin an authenticated session associated with the user profile. Alternatively or additionally, in some embodiments, the indication comprises a system transaction indication that indicates a user associated with a particular user profile indicated interest in initiating a transaction associated with a particular electronic item representation. In one example context for example, during an authenticated session associated with a user profile, a user browses available electronic item representations and interacts with one or more user interface element(s) associated with the electronic item(s) with which the user may initiate a transaction and/or otherwise is interested in. In some embodiments, the indication comprises an indication of a transaction to be offered associated with a user profile corresponding to a particular user identifier. In this regard, the adjustment unit allocation in some embodiments is utilized to set a value offered to the user to initiate the transaction (e.g., an allocation of adjustment units and electronic currency value).

In some embodiments, the user identifier is received in a circumstance where the allocation modeling apparatus 200 and/or an associated system indicates or receives indication of a particular transaction to be offered to a particular user profile. In some embodiments, one or more of such offers for transactions are to be provided at a particular value defined by the adjustment unit allocation. In some such embodiments, the generation and/or use of a particular data model for determining the adjustment unit allocation for a particular offered transaction is determined upon receiving the indication. In one example context, the indication is received when a user associated with a user profile accesses a particular webpage, user interface, and/or other functionality provided by the allocation modeling apparatus 200 and/or an associated system (e.g., a transaction offering system, point redemption system, and/or the like). In some such embodiments, the allocating data model is generated and/or otherwise configured in response to receiving such an indication. Alternatively or additionally, in some embodiments, the lifetime of a generated allocating data model is only long enough to generate and/or cause rendering of a corresponding offer via a user interface, and/or for the lifetime of the user interface (e.g., until the user terminates the user interface and/or an associated software application, or the like).

At operation 1204, the allocation modeling apparatus 200 includes means, such as the model maintenance circuitry 210, model application circuitry 212, communications circuitry 208, input/output circuitry 206, processor 202, and/or the like, or a combination thereof, to aggregate a user profile data set corresponding to a user identifier. In some embodiments, at least a portion of the user profile data set is aggregated from one or more data repositories maintained by the allocation modeling apparatus 200. Alternatively or additionally, in some embodiments, the user profile data set includes one or more data portion(s) queried, retrieved, and/or otherwise received from one or more external data system(s). For example, in some embodiments the allocation modeling apparatus 200 receives (in real-time upon request, or at particular time intervals or occurrence of particular trigger events) one or more portions of user profile data associated with a particular user identifier from the external data systems based on the user identifier and/or another identifying chrematistic associated with the user profile (e.g., a user's name, contact information, and/or the like). In some embodiments, the allocation modeling apparatus 200 retrieves the user profile data set comprising multiple data portions from various external data system(s), such that the user profile data set includes a diverse range of user interaction(s) performed via various system(s) and/or with various entities.

At operation 1206, the allocation modeling apparatus 200 includes means, such as the model maintenance circuitry 210, model application circuitry 212, communications circuitry 208, input/output circuitry 206, processor 202, and/or the like, or a combination thereof, to determine an adjustment unit count corresponding to the user identifier. In some embodiments, the allocation modeling apparatus 200 queries one or more data repositories based at least in part on the user identifier to retrieve the adjustment unit allocation corresponding to the user identifier. Alternatively or additionally, in some embodiments, the allocation modeling apparatus 200 queries one or more external data system(s) based at least in part on the user identifier (or another data value associated with the user profile corresponding to the user identifier) to retrieve the adjustment unit count from the external data system. The adjustment unit count in some embodiments represents a number of available adjustment units that a user profile is associated with, and thus are allocable towards a particular transaction.

At optional operation 1208, the allocation modeling apparatus 200 includes means, such as the model maintenance circuitry 210, model application circuitry 212, communications circuitry 208, input/output circuitry 206, processor 202, and/or the like, or a combination thereof, to configure an electronic item selection model associated with the user identifier. In some embodiments, the electronic item selection model comprises an algorithmic, machine learning, and/or statistical model. In some embodiments, the allocation modeling apparatus 200 configures the electronic item selection model by training the electronic item selection model utilizing a retrieved item selection training data set. In some embodiments, the electronic item selection model is configured based at least in part on data specific to the user profile corresponding to the user identifier (e.g., historical data performed associated with that user profile). Alternatively or additionally, in some contexts (e.g., where the user profile is new or otherwise not associated with historical data), the electronic item selection model is configured based at least in part on data associated with other user profile(s) determined similar to the user profile corresponding to the user identifier. For example, in some embodiments, the other user profile(s) are similar based on having the same and/or similar data values for one or more properties associated with the user profiles (e.g., demographic information, location information, interest information, and/or the like).

At operation 1210, the allocation modeling apparatus 200 includes means, such as the model maintenance circuitry 210, model application circuitry 212, communications circuitry 208, input/output circuitry 206, processor 202, and/or the like, or a combination thereof, to identify an electronic item representation. The electronic item representation is identified for purposes of determining an adjustment pint allocation specific to that electronic item representation. In some embodiments, the electronic item representation is identified in an earlier-received indication, for example received at operation 1202. Alternatively or additionally, in some embodiments, the electronic item representation is identified utilizing a specially configured electronic item selection model, for example configured at operation 1208. In some example embodiments, the electronic item representation is identified during selection as likely of interest to the user profile associated with the user identifier, and/or like to be transacted by the user associated with the user identifier.

At operation 1212, the allocation modeling apparatus 200 includes means, such as the model maintenance circuitry 210, model application circuitry 212, communications circuitry 208, input/output circuitry 206, processor 202, and/or the like, or a combination thereof, to determine electronic item transactability data corresponding to the electronic item representation. In some embodiments, the allocation modeling apparatus 200 retrieves electronic item transactability data corresponding to the electronic item representation from one or more data repositories maintained by the allocation modeling apparatus 200. Alternatively or additionally, in some embodiments, the allocation modeling apparatus 200 retrieves the electronic item transactability data corresponding to the electronic item representation from one or more external data system(s). In some embodiments, the electronic item transactability data comprises one or more data values for data property/properties associated with the base cost of the electronic item representation, a minimum and/or maximum profit rate for the electronic item representation, and/or the like. Additionally or alternatively, in some embodiments, the electronic item transactability data comprises historical data associated with transaction(s) initiated for the electronic item representation by other user profile(s), for example the value(s) at which such transaction(s) were initiated, how many transaction(s) were initiated above and/or below a mean value, and/or the like.

At optional operation 1214, the allocation modeling apparatus 200 includes means, such as the model maintenance circuitry 210, model application circuitry 212, communications circuitry 208, input/output circuitry 206, processor 202, and/or the like, or a combination thereof, to configure an allocating data model associated with the user identifier. In some embodiments, the allocating data model comprises an algorithmic, machine learning, and/or statistical model. In some embodiments, the allocation modeling apparatus 200 configures the allocating data model by training the allocating data model utilizing a retrieved allocating training data set. In some embodiments, the allocating data model is configured based at least in part on data specific to the user profile corresponding to the user identifier (e.g., using historical data initiated by and/or otherwise performed associated with the user profile). Alternatively or additionally, in some embodiments (e.g., where the user profile is new or otherwise not associated with historical data), the allocating data model is configured based at least in part on data associated with other user profile(s) determined similar to the user profile corresponding to the user identifier. For example, in some embodiments, the other user profile(s) are similar based on having the same and/or similar data values for one or more properties associated with the user profiles (e.g., demographic information, location information, interest information, and/or the like).

In some embodiments, the allocating data model is configured by determining one or more model parameters corresponding to the user identifier. In some such embodiments, the model parameter(s) define the allocating data model. In one example context, the model parameter(s) is/are determined from processing a retrieved historical and/or training data set corresponding to the user profile (or similar user profile(s)) associated with the user identifier. In some embodiments, for example, model parameters corresponding to a maximum subjective item value based on the current adjustment unit count corresponding to the user identifier (e.g., a MAXP as described herein), a skew parameter value, and/or a plateau parameter value are determined. In some embodiments, one or more of the model parameters is/are determined based at least in part on the user profile data set corresponding to the user identifier, the adjustment unit count corresponding to the user identifier, and/or the electronic item transactability data for the electronic item representation identified for processing. In some embodiments, the resulting allocating data model is specially configured particularly for the user identifier, such that each user identifier is associated with a different allocating data model specifically configured for the user profile corresponding to that user identifier.

At operation 1216, the allocation modeling apparatus 200 includes means, such as the model maintenance circuitry 210, model application circuitry 212, communications circuitry 208, input/output circuitry 206, processor 202, and/or the like, or a combination thereof, to determine an adjustment unit allocation corresponding to the electronic item representation. In some embodiments the adjustment unit allocation is determined by applying an input data set to an allocating data model corresponding to the user identifier. For example, in some embodiments the input data set comprises at least a portion of the user profile data set, the adjustment unit count, and the electronic item transactability data. Alternatively or additionally in some embodiments, for example where the allocating data model is previously configured, the allocating data model comprises only the electronic item transactability data and/or an adjustment unit count.

At operation 1218, the allocation modeling apparatus 200 includes means, such as the model maintenance circuitry 210, model application circuitry 212, communications circuitry 208, input/output circuitry 206, processor 202, and/or the like, or a combination thereof, to output the adjustment unit allocation associated with the user identifier. In some embodiments, the adjustment unit allocation associated with the user identifier is output to a particular user interface. Alternatively or additionally, in some embodiments the adjustment unit allocation is output for further processing by the allocation modeling apparatus 200 and/or an associated system. Alternatively or additionally still, in some embodiments, the allocation modeling apparatus 200 outputs the adjustment unit allocation to a user device to cause rendering of a particularly configured user interface via the user device, the user interface configured based at least in part on the adjustment unit allocation. In some embodiments, the adjustment unit allocation is output to the user device to cause rendering of a user interface comprising a user interface that is associated with initiating a transaction for the electronic item representation based at least in part on the adjustment unit allocation. In some such embodiments, the interface element is visually distinguished from other interface element(s) for initiating the transaction associated with the electronic item representation utilizing other adjustment unit allocation(s), and/or is rendered prominently within the user interface for easy noticeability and/or interaction with by the user.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory, the at least one memory having computer-coded instructions coded thereon that, in execution with the at least one processor, cause the apparatus to:
    receive a selection input that identifies an electronic item representation and a user identifier;
    determine electronic item transactability data and an adjustment unit count to based at least in part on the electronic item representation and the user identifier;
    receive, from a model repository, an allocating data model that corresponds to the user identifier;
    apply the allocating data model to the electronic item representation and the adjustment unit count to determine an adjustment unit allocation for the electronic item representation and the user identifier, wherein the allocating data model defines a curve based at least in part on a skew parameter and a plateau parameter that is based at least in part on the electronic item transactability data and the user identifier;
    modify the electronic item representation based on the adjustment unit allocation; and
    responsive to the selection input, cause rendering, to a user device associated with the user identifier, of a user interface for the modified electronic item representation, wherein the user interface comprises one or more of (a) an interface element associated with the adjustment unit allocation for initiating a transaction associated with the electronic item representation, (b) a first additional interface element associated with a first alternative adjustment unit allocation corresponding to use of no adjustment allocation points to initiate the transaction associated with the electronic item representation, or (c) a second additional interface element associated with a second alternative adjustment unit allocation corresponding to use of only adjustment allocation points to initiate the transaction.

2. The apparatus according to claim 1, the apparatus further caused to:
    receive a system transaction indication, the system transaction indication associated with the user identifier and an electronic item identifier that identifies the electronic item representation.

3. The apparatus according to claim 1, the apparatus further caused to:
    configure the allocating data model based at least in part on one or more model parameters.

4. The apparatus according to claim 3, wherein the one or more model parameters comprises the skew parameter, the plateau parameter, and an actual maximum value corresponding to the electronic item representation, the user identifier, and the adjustment unit count.

5. The apparatus according to claim 1, the apparatus further caused to:
    train an electronic item selection model corresponding to the user identifier based at least in part on an item selection training data set; and
    generate, utilizing the electronic item selection model, a selected item set comprising at least the electronic item representation.

6. The apparatus according to claim 1, wherein the user identifier is associated with an empty user profile data set, and wherein the apparatus is further caused to:
    determine at least one other user profile similar to a user profile corresponding to the user identifier based at least in part on a profile characteristic;
    retrieve a second user profile data set corresponding to the at least one other user profile; and
    aggregate a user profile data set corresponding to the user identifier to include the second user profile data set.

7. The apparatus according to claim 6, wherein the interface element associated with the adjustment unit allocation is rendered visually prominent with respect to at least one other interface element of the user interface.

8. The apparatus according to claim 1, the apparatus further caused to:
    receive an indication of the transaction;
    in response to receiving the indication of the transaction, configure the allocating data model based on data associated with the electronic item representation and a user profile corresponding to the user identifier; and
    terminate storage of the allocating data model in response to determining the adjustment unit allocation.

9. The apparatus according to claim 1, wherein to cause rendering of the user interface for the modified electronic item representation, the apparatus further caused to:
    receive an indication of the transaction;
    configure the allocating data model based on data associated with the electronic item representation and a user profile corresponding to the user identifier;
    maintain the allocating data model while the user interface is accessible to the user profile;
    receive a second indication that the user interface is no longer accessible to the user profile; and
    terminate storage of the allocating data model in response to the second indication.

10. A computer-implemented method comprising:
    receiving a selection input that identifies an electronic item representation and a user identifier;
    determining electronic item transactability data and an adjustment unit count based at least in part on the electronic item representation and the user identifier;
    receiving, from a model repository, an allocating data model that corresponds to the user identifier;

applying the allocating data model to the electronic item representation and the adjustment unit count to determine an adjustment unit allocation for the electronic item representation and the user identifier, wherein the allocating data model defines a curve based at least in part on a skew parameter and a plateau parameter that is based at least in part on the electronic item transactability data and the user identifier;

modifying the electronic item representation based on the adjustment unit allocation; and responsive to the selection input, causing rendering, to a user device associated with the user identifier, of a user interface for the modified electronic item representation, wherein the user interface comprises one or more of (a) an interface element associated with the adjustment unit allocation for initiating a transaction associated with the electronic item representation, (b) a first additional interface element associated with a first alternative adjustment unit allocation corresponding to use of no adjustment allocation points to initiate the transaction associated with the electronic item representation, or (c) a second additional interface element associated with a second alternative adjustment unit allocation corresponding to use of only adjustment allocation points to initiate the transaction.

11. The computer-implemented method according to claim 10, the computer-implemented method further comprising configuring the allocating data model based at least in part on one or more model parameters, wherein the one or more model parameters comprises the skew parameter, the plateau parameter, and an actual maximum value corresponding to the electronic item representation, the user identifier, and the adjustment unit count.

12. The computer-implemented method according to claim 10, the computer-implemented method further comprising:

training an electronic item selection model corresponding to the user identifier based at least in part on an item selection training data set; and generating, utilizing the electronic item selection model, a selected item set comprising at least the electronic item representation.

13. The computer-implemented method according to claim 10, wherein the user identifier is associated with an empty user profile data set, and wherein the computer-implemented method further comprises:

determining at least one other user profile similar to a user profile corresponding to the user identifier based at least in part on a profile characteristic;

retrieving a second user profile data set corresponding to the at least one other user profile; and aggregating a user profile data set corresponding to the user identifier to include the second user profile data set.

14. The computer-implemented method according to claim 10, the computer-implemented method further comprising:

receiving an indication of the transaction;

in response to receiving the indication of the transaction, configuring the allocating data model based on data associated with the electronic item representation and a user profile corresponding to the user identifier; and terminating storage of the allocating data model in response to determining the adjustment unit allocation.

15. The computer-implemented method according to claim 12, wherein causing rendering of the user interface for the modified electronic item representation further comprises:

receiving an indication of the transaction;

configuring the allocating data model based on data associated with the electronic item representation and a user profile corresponding to the user identifier;

maintaining the allocating data model while the user interface is accessible to the user;

receiving a second indication that the user interface is no longer accessible to the user; and terminating storage of the allocating data model in response to the second indication.

16. The computer-implemented method of claim 10, wherein the interface element associated with the adjustment unit allocation identifies an adjustable unit count that is adjustable based on user input to the interface element.

17. A non-transitory computer-readable storage medium having computer program code that, when executed by at least one processor, causes the at least one processor to:

receiving a selection input that identifies an electronic item representation and a user identifier;

determining electronic item transactability data and an adjustment unit count based at least in part on the electronic item representation and the user identifier;

receiving, from a model repository, an allocating data model that corresponds to the user identifier;

applying the allocating data model to the electronic item representation and the adjustment unit count to determine an adjustment unit allocation for the electronic item representation and the user identifier, wherein the allocating data model defines a curve based at least in part on a skew parameter and a plateau parameter that is based at least in part on the electronic item transactability data and the user identifier;

modifying the electronic item representation based on the adjustment unit allocation; and responsive to the selection input, causing rendering, to a user device associated with the user identifier, of a user interface for the modified electronic item representation, wherein the user interface comprises one or more of (a) an interface element associated with the adjustment unit allocation for initiating a transaction associated with the electronic item representation, (b) a first additional interface element associated with a first alternative adjustment unit allocation corresponding to use of no adjustment allocation points to initiate the transaction associated with the electronic item representation, or (c) a second additional interface element associated with a second alternative adjustment unit allocation corresponding to use of only adjustment allocation points to initiate the transaction.

* * * * *